US011632223B2

(12) United States Patent
Abedini et al.

(10) Patent No.: US 11,632,223 B2
(45) Date of Patent: Apr. 18, 2023

(54) SLOT FORMAT CONFIGURATION TO SUPPORT FULL-DUPLEX OPERATION

(71) Applicant: QUALCOMM Incorporated, San Diego, CA (US)

(72) Inventors: Navid Abedini, Basking Ridge, NJ (US); Kapil Gulati, Belle Mead, NJ (US); Jianghong Luo, Skillman, NJ (US); Andrzej Partyka, Bedminster, NJ (US); Luca Blessent, Whitehouse Station, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/129,328

(22) Filed: Dec. 21, 2020

(65) Prior Publication Data

US 2021/0203469 A1     Jul. 1, 2021

Related U.S. Application Data

(60) Provisional application No. 62/954,205, filed on Dec. 27, 2019.

(51) Int. Cl.
*H04W 56/00*     (2009.01)
*H04L 5/14*      (2006.01)
(Continued)

(52) U.S. Cl.
CPC ........... *H04L 5/14* (2013.01); *H04W 72/0446* (2013.01); *H04W 72/10* (2013.01)

(58) Field of Classification Search
CPC ...... H04L 5/14; H04W 72/0446; H04W 72/10
(Continued)

(56) References Cited

U.S. PATENT DOCUMENTS

2020/0275418 A1* 8/2020 Wong .................... H04L 5/0007
2020/0404646 A1* 12/2020 Zhang .................. H04B 7/2643
(Continued)

OTHER PUBLICATIONS

Huawei, et al ., "TDD Configuration for IAB," 3GPP Draft, 3GPP TSG RAN WG1 Meeting #97, R1-1907517, 3rd Generation Partnership Project (3GPP), Mobile Competence Centre, 650, Route Des Lucioles, F-06921, Sophia-Antipolis Cedex, France, vol. RAN WG1. No. Reno, USA, 20190513-20190517, May 13, 2019 (May 13, 2019), XP051728950, 3 pages, Retrieved from the Internet: URL: http://www.3gpp.org/ftp/Meetings%5F3GPP%5FSYNC/RAN1/Docs/R1%2D1907517%2Ezip [retrieved on May 13, 2019] the whole document.
(Continued)

*Primary Examiner* — Sai Ming Chan
(74) *Attorney, Agent, or Firm* — Arun Swain; Harrity & Harrity, LLP

(57) ABSTRACT

Various aspects of the present disclosure generally relate to wireless communication. In some aspects, a wireless node may receive, from a control node, information identifying a slot configuration pattern for a wireless communication link between the wireless node and another wireless node. For example, the information identifying the slot configuration pattern may indicate one or more symbols that are configured to support full-duplex communication. The wireless node may communicate with the other wireless node in the one or more symbols configured to support full-duplex communication in accordance with the slot configuration pattern. Numerous other aspects are provided.

30 Claims, 12 Drawing Sheets

(51) Int. Cl.
*H04W 72/10* (2009.01)
*H04W 72/0446* (2023.01)

(58) Field of Classification Search
USPC .......................................................... 370/277
See application file for complete search history.

(56) References Cited

U.S. PATENT DOCUMENTS

| | | | |
|---|---|---|---|
| 2021/0006369 A1* | 1/2021 | Bai | H04L 1/189 |
| 2021/0329660 A1* | 10/2021 | Zhang | H04W 72/1268 |
| 2022/0060247 A1* | 2/2022 | Harada | H04W 72/0426 |

OTHER PUBLICATIONS

Huawei, et al., "On Resource Coordination and Dynamic Scheduling in IAB," 3GPP Draft, 3GPP TSG RAN WG1 Meeting #95, R1-1812201, 3rd Generation Partnership Project (3GPP), Mobile Competence Centre, 650, Route Des Lucioles, F-06921, Sophia-Antipolis Cedex, France, vol. RAN WG1. No. Spokane, USA; 20181112-20181116, Nov. 11, 2018 (Nov. 11, 2018), XP051554073, 5 pages, Retrieved from the Internet: URL: http://www.3gpp.org/ftp/Meetings%5F3GPP%5FSYNC/RAN1/Docs/R1%2D1812201%2Ezip [retrieved on Nov. 11, 2018] the whole document.
International Search Report and Written Opinion—PCT/US2020/070953—ISA/EPO—Apr. 1, 2021.
Nokia, et al. "Resource Allocation/Coordination Between Parent BH and Child links", 3GPP TSG RAN WG1 Meeting #95, R1-1812702, 3rd Generation Partnership Project (3GPP), Mobile Competence Centre, 650, Route Des Lucioles, F-06921, Sophia-Antipolis Cedex, France, 20181112-20181116, Nov. 3, 2018 (Mar. 11, 2018), 11 Pages, the whole document, Retrieved from the Internet URL: http://www.3gpp.org/ftp/tsg%5Fran/WG1%5FRL1/TSGR1%5F95/Docs/R1%2D1812702%2Ezip pp. 3-4. 2.2. IAB resource types p. 5. 2.3 Resource pool coordination.
ZTE: "Overview of Physical Layer Enhancements for IAB", 3GPP Draft, 3GPP TSG RAN WG1 Meeting #93, R1-1806024, 3rd Generation Partnership Project (3GPP), Mobile Competence Centre, 650, Route Des Lucioles, F-06921 Sophia-Antipolis Cedex, France, vol. RAN WG1, No. Busan, Korean, 20180521-20180525, May 12, 2018 (May 12, 2018), XP051462292, 9 pages, Retrieved from the Internet: URL: http://www.3gpp.org/ftp/tsg%5Fran/WG1%5FRL1/TSGR1%5F93/Docs. [retrieved on May 12, 2018] sections 1-3, 4, pp. 1-3. 2 Multiplexing of Access/backhaul link pp. 3-5, 3 Frame structure design pp. 6-7, 4 SFI enhancement.

* cited by examiner

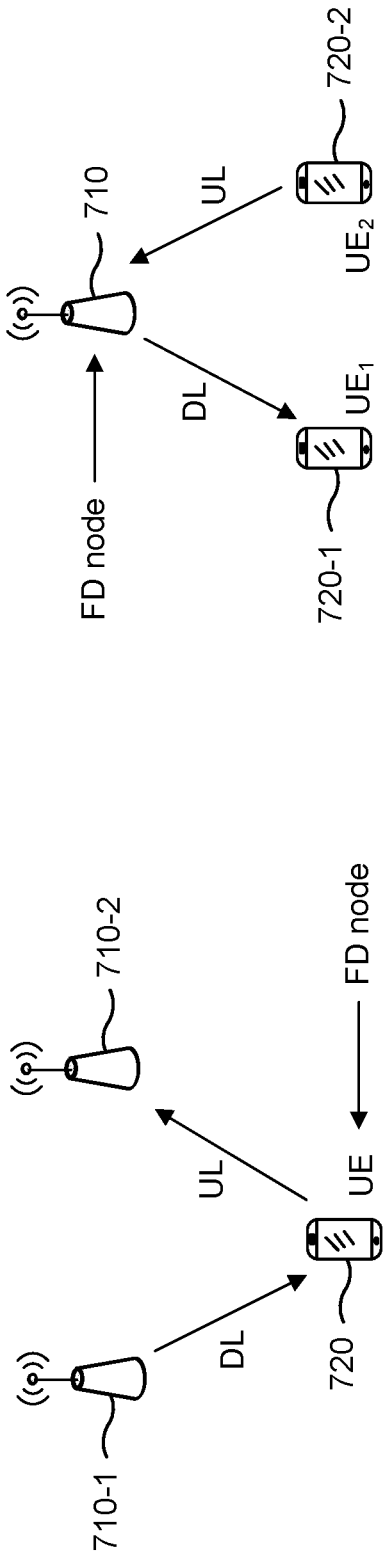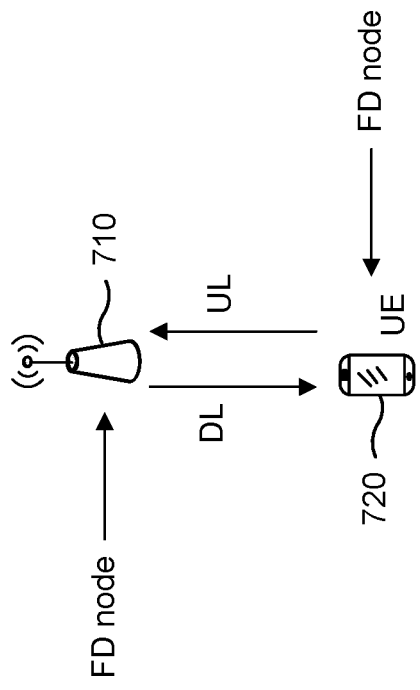
FIGURE 7A
FIGURE 7B
FIGURE 7C

SLOT FORMAT CONFIGURATION TO SUPPORT FULL-DUPLEX OPERATION

CROSS-REFERENCE TO RELATED APPLICATION

This Patent Application claims priority to U.S. Provisional Patent Application No. 62/954,205, filed on Dec. 27, 2019, entitled "SLOT FORMAT CONFIGURATION TO SUPPORT FULL-DUPLEX OPERATION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and specifically, to techniques and apparatuses for providing a slot format configuration to support full-duplex operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In a wireless network, a control node may configure a wireless node with a slot configuration for downlink communication or uplink communication. However, the control node may be unable to signal, to the wireless node, a slot configuration that includes one or more slots or symbols that may be used for full-duplex communication, which generally refers to simultaneous transmission and reception at a particular frequency. For example, existing slot formats generally have a structure in which slots or symbols can be labelled as downlink-only, uplink-only, or flexible (downlink or uplink, but not both). Accordingly, even if the control node and the wireless node have capabilities to perform full-duplex communication, the control node may be unable to configure a slot configuration that enables the full-duplex communication capabilities to be utilized for a wireless communication link between the wireless node and another wireless node (for example, a child of the wireless node). As a result, the wireless node may experience decreased throughput on the wireless communication link or increased latency on the wireless communication link, among other examples.

SUMMARY

In some aspects, a method of wireless communication, performed by a wireless node, may include receiving, from a control node, information identifying a slot configuration pattern for a wireless communication link between the wireless node and another wireless node. In some aspects, the information identifying the slot configuration pattern indicates one or more symbols configured to support full-duplex communication. The method may include communicating with the wireless node in the one or more symbols configured to support full-duplex communication in accordance with the slot configuration pattern.

In some aspects, a wireless node for wireless communication may include a memory and one or more processors operatively coupled to the memory. The memory and the one or more processors may be configured to receive, from a control node, information identifying a slot configuration pattern for a wireless communication link between the wireless node and another wireless node. In some aspects, the information identifying the slot configuration pattern indicates one or more symbols configured to support full-duplex communication. The memory and the one or more processors may be configured to communicate with the other wireless node in the one or more symbols configured to support full-duplex communication in accordance with the slot configuration pattern.

In some aspects, a non-transitory computer-readable medium may store one or more instructions for wireless communication. The one or more instructions, when executed by one or more processors of a wireless node, may cause the one or more processors to receive, from a control node, information identifying a slot configuration pattern for a wireless communication link between the wireless node and another wireless node. In some aspects, the information identifying the slot configuration pattern indicates one or more symbols configured to support full-duplex communication. The one or more instructions, when executed by the one or more processors of the wireless node, may cause the one or more processors to communicate with the other wireless node in the one or more symbols configured to support full-duplex communication in accordance with the slot configuration pattern.

In some aspects, an apparatus for wireless communication may include means for receiving, from a control node, information identifying a slot configuration pattern for a wireless communication link between the apparatus and a wireless node. In some aspects, the information identifying the slot configuration pattern indicates one or more symbols configured to support full-duplex communication. The apparatus may include means for communicating with the wireless node in the one or more symbols configured to support full-duplex communication in accordance with the slot configuration pattern.

In some aspects, a method of wireless communication, performed by a control node, may include determining a slot configuration pattern for a wireless communication link between a wireless node and another wireless node. The method may include transmitting, to the wireless node, information identifying the slot configuration pattern for the wireless link. In some aspects, the information identifying the slot configuration pattern indicates one or more symbols configured to support full-duplex communication.

In some aspects, a control node for wireless communication may include a memory and one or more processors operatively coupled to the memory. The memory and the one or more processors may be configured to determine a slot configuration pattern for a wireless communication link between a wireless node and another wireless node. The memory and the one or more processors may be configured to transmit, to the wireless node, information identifying the slot configuration pattern for the wireless link. In some aspects, the information identifying the slot configuration pattern indicates one or more symbols configured to support full-duplex communication.

In some aspects, a non-transitory computer-readable medium may store one or more instructions for wireless communication. The one or more instructions, when executed by one or more processors of a wireless node, may cause the one or more processors to determine a slot configuration pattern for a wireless communication link between a wireless node and another wireless node. The one or more instructions, when executed by the one or more processors of the wireless node, may cause the one or more processors to transmit, to the wireless node, information identifying the slot configuration pattern for the wireless link. In some aspects, the information identifying the slot configuration pattern indicates one or more symbols configured to support full-duplex communication.

In some aspects, an apparatus for wireless communication may include means for determining a slot configuration pattern for a wireless communication link between a wireless node and another wireless node. The apparatus may include means for transmitting, to the wireless node, information identifying the slot configuration pattern for the wireless link. In some aspects, the information identifying the slot configuration pattern indicates one or more symbols configured to support full-duplex communication.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 7A-7C are diagrams illustrating examples of full-duplex communication in accordance with various aspects of the present disclosure.

DETAILED DESCRIPTION

Figure 1:
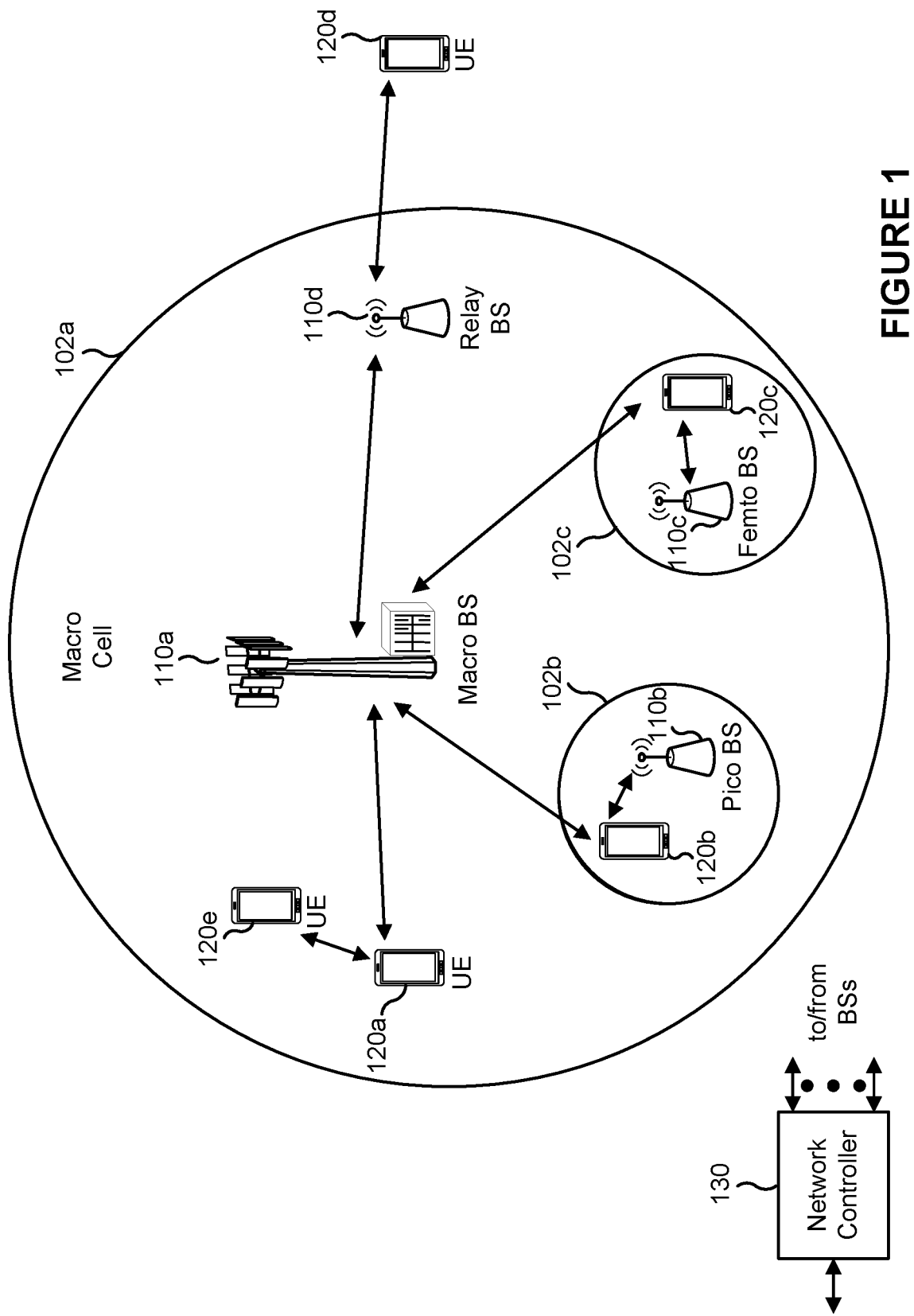
FIG. 1 is a diagram illustrating an example of a wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to providing a wireless node (for example, a UE or an integrated access and backhaul (IAB) node, among other examples) with a slot format configuration to support full-duplex operation. Some aspects more specifically relate to a control node (for example, a base station, an IAB donor, or a parent IAB node) transmitting, to a wireless node, one or more signaling messages that explicitly indicate one or more slots or symbols configured to support full-duplex operation. Additionally or alternatively, the one or more signaling messages may include one or more signaling messages in which one or more slots or symbols are labelled as downlink-only or uplink-only, and a subsequent signaling message may relabel the downlink-only slots or symbols as uplink or flexible slots or symbols or relabel the uplink-only slots or symbols as downlink or flexible slots or symbols to implicitly indicate the slots or symbols configured to support full-duplex operation. Accordingly, in some aspects, the wireless node may use the slot format configuration to communicate with another wireless node (for example, a child of the wireless node) in the slots or symbols configured to support full-duplex operation. Furthermore, in some aspects, the wireless node may apply one or more rules to selectively perform full-duplex operations in the slots or symbols labelled as full-duplex or flexible, to perform half-duplex operations in a direction that conflicts with a symbol type (for example, to perform downlink communications in an uplink symbol or uplink communications in a downlink symbol), or to perform full-duplex operations in one or more symbols or slots that are labelled as uplink or downlink-only.

Particular aspects of the subject matter described in this disclosure can be implemented to realize one or more of the following potential advantages. In some examples, the described techniques can be used to enable the wireless node to simultaneously perform uplink communication and downlink communication in full-duplex, flexible, downlink-only, or uplink-only slots or symbols. In some examples, the described techniques can be used to provide the wireless node with flexibility to perform half-duplex operations in an opposite direction from a scheduled slot or symbol type. In this way, the wireless node may transmit and receive a greater quantity of communications relative to slots or symbols that are limited to uplink-only or downlink-only, which increases throughput on the wireless communication link between the wireless node and the other wireless node. Moreover, the capability to perform full-duplex communication decreases the amount of time that a communication has to be delayed before the communication can be transmitted to or received by the wireless node, which decreases latency on the wireless communication link. In addition, the described techniques can be used to increase flexibility in scheduling communications for the wireless node (for example, by providing a slot format configuration that enables scheduling full-duplex communications or half-duplex communications that are not constrained to a downlink or an uplink direction, among other examples).

FIG. 1 is a diagram illustrating an example of a wireless network in accordance with various aspects of the present disclosure. The wireless network may be or may include elements of a 5G (NR) network or an LTE network, among other examples. The wireless network may include one or more base stations 110 (shown as base station 110a, base station 110b, base station 110c, and base station 110d) and other network entities. A base station is an entity that communicates with user equipment (UEs) and may also be referred to as an NR base station, a Node B, a gNB, a 5G node B (NB), an access point, or a transmit receive point (TRP), among other examples. Each base station may provide communication coverage for a particular geographic area. In 3GPP, the term "cell" can refer to a coverage area of a base station or a base station subsystem serving this coverage area, depending on the context in which the term is used.

A base station may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro base station. A base station for a pico cell may be referred to as a pico base station. A base station for a femto cell may be referred to as a femto base station or a home base station. A base station may support one or multiple (for example, three) cells.

The wireless network may be a heterogeneous network that includes base stations of different types, such as macro base stations, pico base stations, femto base stations, or relay base stations. These different types of base stations may have different transmit power levels, different coverage areas, and different impacts on interference in the wireless network. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, a base station 110a may be a macro base station for a macro cell 102a, a base station 110b may be a pico base station for a pico cell 102b, and a base station 110c may be a femto base station for a femto cell 102c. A network controller 130 may couple to the set of base stations 102a, 102b, 110a and 110b, and may provide coordination and control for these base stations. Network controller 130 may communicate with the base stations via a backhaul. The base stations may also communicate with one another, for example, directly or indirectly via a wireless or wireline backhaul.

In some aspects, a cell may not be stationary, rather, the geographic area of the cell may move in accordance with the location of a mobile base station. In some aspects, the base stations may be interconnected to one another or to one or more other base stations or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a base station or a UE) and send a transmission of the data to a downstream station (for example, a UE or a base station). A relay station may also be a UE that can relay transmissions for other UEs. In the example shown in FIG. 1, a relay station 110d may communicate with macro base station 110a and a UE 120d in order to facilitate communication between base station 110a and UE 120d. A relay station may also be referred to as a relay base station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol, a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
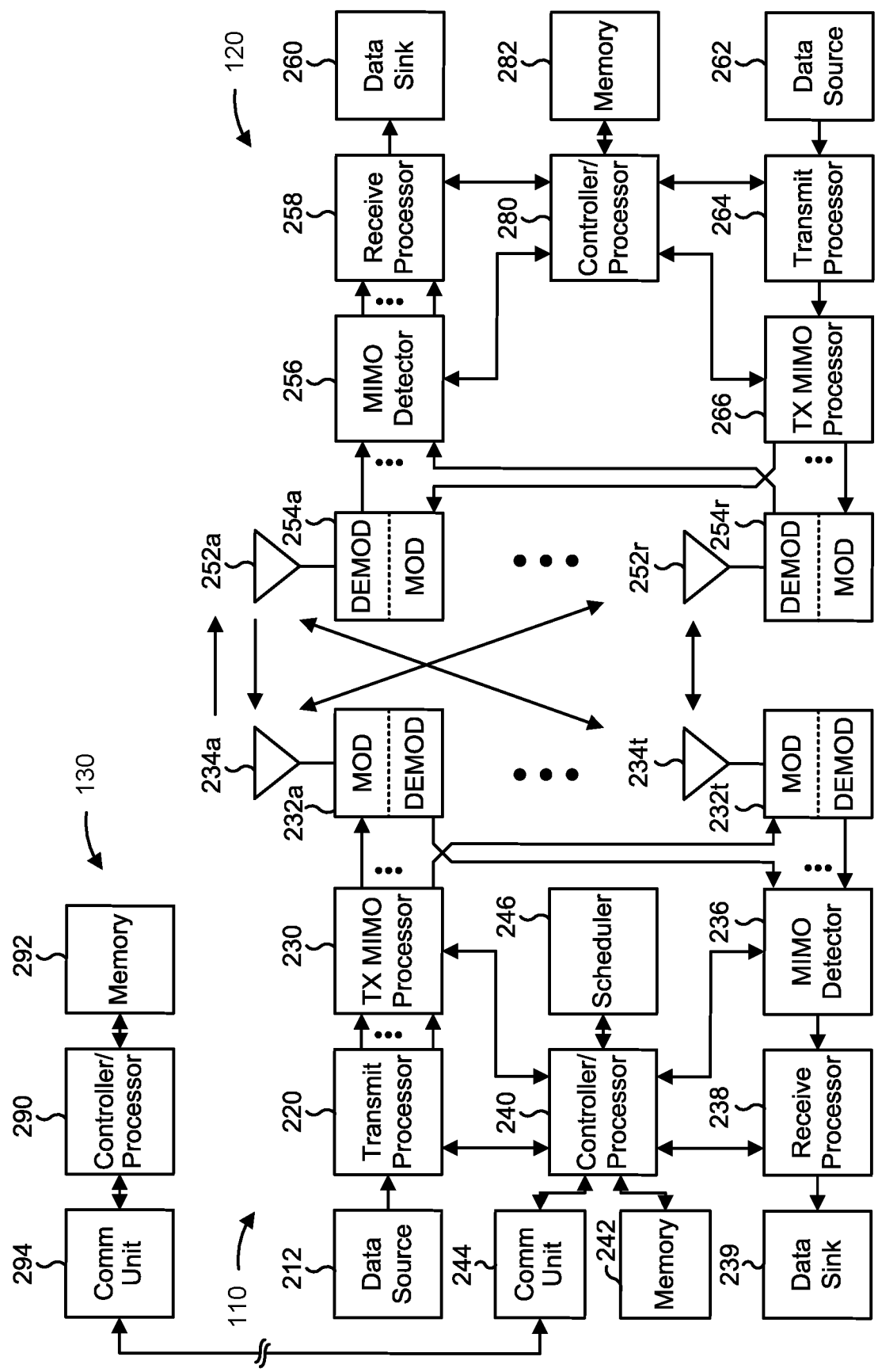
FIG. 2 is a diagram illustrating an example base station in communication with a user equipment (UE) in a wireless network in accordance with various aspects of the present disclosure.

FIG. 2 is a diagram illustrating an example base station in communication with a UE in a wireless network in accordance with various aspects of the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with a slot format configuration to support full-duplex operation, as described in more detail elsewhere herein. Additionally or alternatively, a node in an integrated access and backhaul (IAB) network (for example, an IAB node, an IAB donor, a control node, an IAB child node, or an IAB parent node) or another suitable wireless network may perform one or more techniques associated with a slot format configuration to support full-duplex operation. As described in more detail elsewhere herein, such a node may be an IAB child node or another suitable node that includes a mobile termination (MT) component and a distributed unit (DU) component. Additionally or alternatively, the node may be an IAB donor node, an IAB parent node, or another suitable node that includes a central unit (CU) component and a DU component. In some aspects, the MT component may perform one or more functions of a UE 120 as described herein or may include one or more components of a UE 120 as described herein. In some aspects, the DU component may perform one or more functions of a base station 110 as described herein, such as scheduling, or may include one or more components of a base station 110 as described herein. In some aspects, the CU component may perform one or more functions of a base station 110 described herein, such as configuration for other nodes, or may include one or more components of a base station 110 as described herein.

Figure 9:
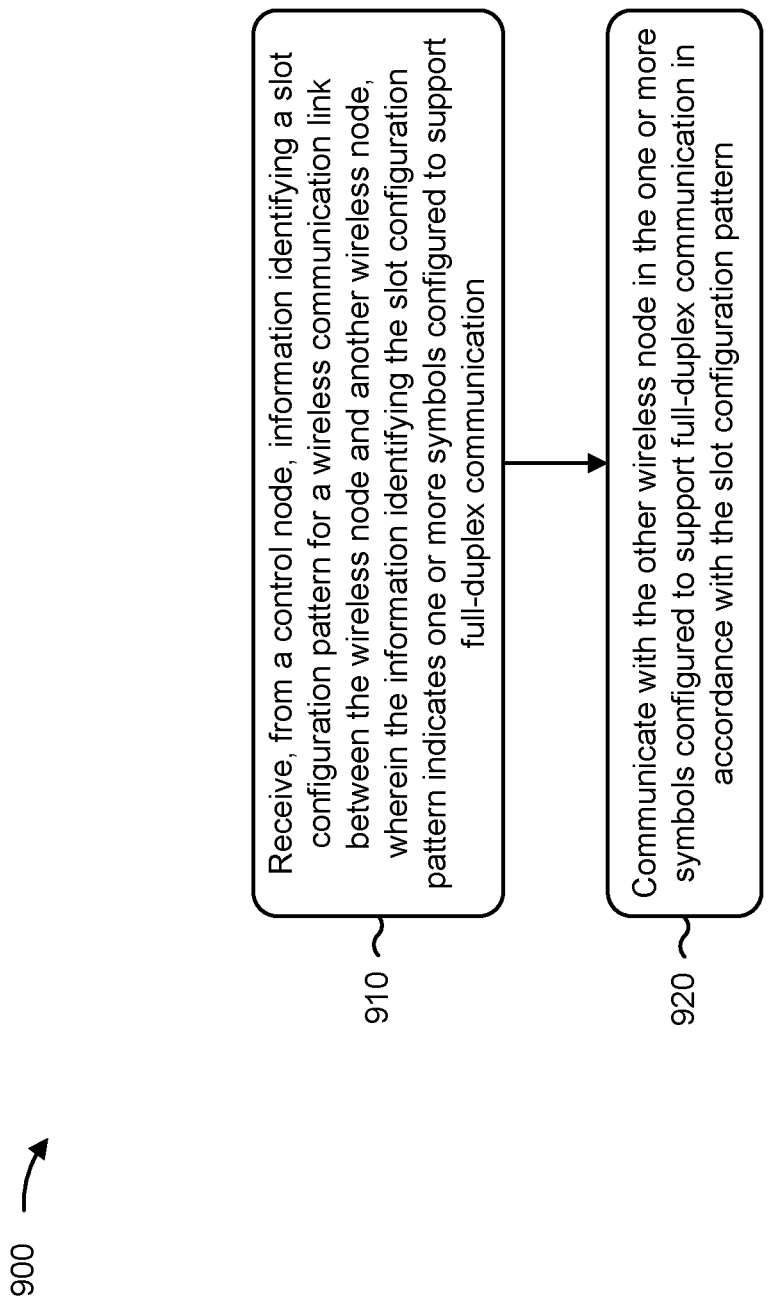
FIG. 9 is a flowchart illustrating an example process performed, for example, by a wireless node in accordance with various aspects of the present disclosure.
Figure 10:
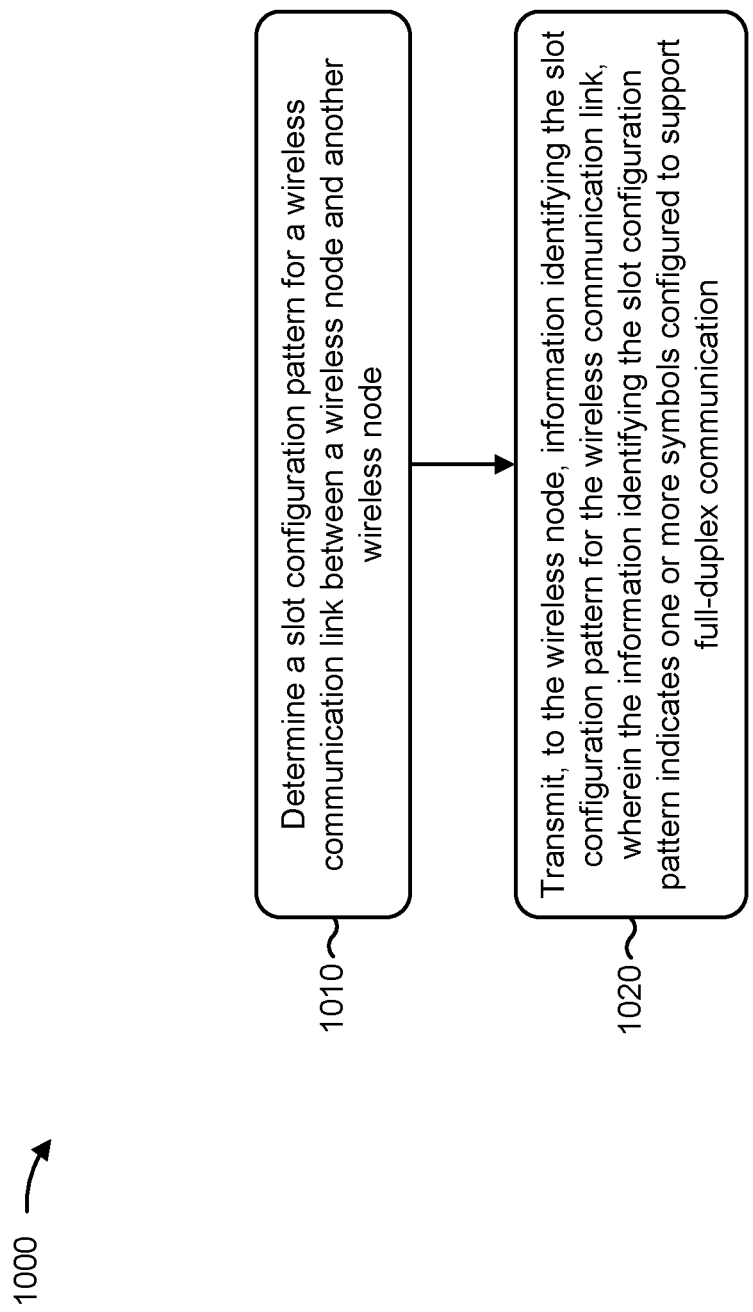
FIG. 10 is a flowchart illustrating an example process performed, for example, by a control node in accordance with various aspects of the present disclosure.

In some aspects, controller/processor 240 of base station 110 or a node (for example, an IAB donor node or an IAB parent node), controller/processor 280 of UE 120 or a node (for example, an IAB child node), or any other component(s) of FIG. 2 may perform or direct operations of, for example, process 900 of FIG. 9, process 1000 of FIG. 10, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, or other processes as described herein. In some aspects, executing instructions may include running the instructions, converting the instructions, compiling the instructions, or interpreting the instructions, among other examples.

In some aspects, a wireless node (such as UE 120, an IAB node, or an MT component of an IAB node) may include means for receiving, from a control node (such as base station 110, an IAB donor node, an IAB parent node, a DU component, or a CU component), information identifying a slot configuration pattern for a wireless communication link between the wireless node and another wireless node (such as a child of the wireless node), where the information identifying the slot configuration pattern may indicate one or more symbols configured to support full-duplex communication, or means for communicating with the other wireless node in the one or more symbols configured to support full-duplex communication in accordance with the slot configuration pattern, among other examples. In some aspects, such means may include one or more components of UE 120 or base station 110 (which may be included in the wireless node) described in connection with FIG. 2.

In some aspects, a control node may include means for determining a slot configuration pattern for a wireless communication link between a wireless node and another wireless node or means for transmitting, to the wireless node, information identifying the slot configuration pattern for the wireless link, where the information identifying the slot configuration pattern indicates one or more symbols configured to support full-duplex communication. In some aspects, such means may include one or more components of base station 110 described in connection with FIG. 2.

Figure 3:
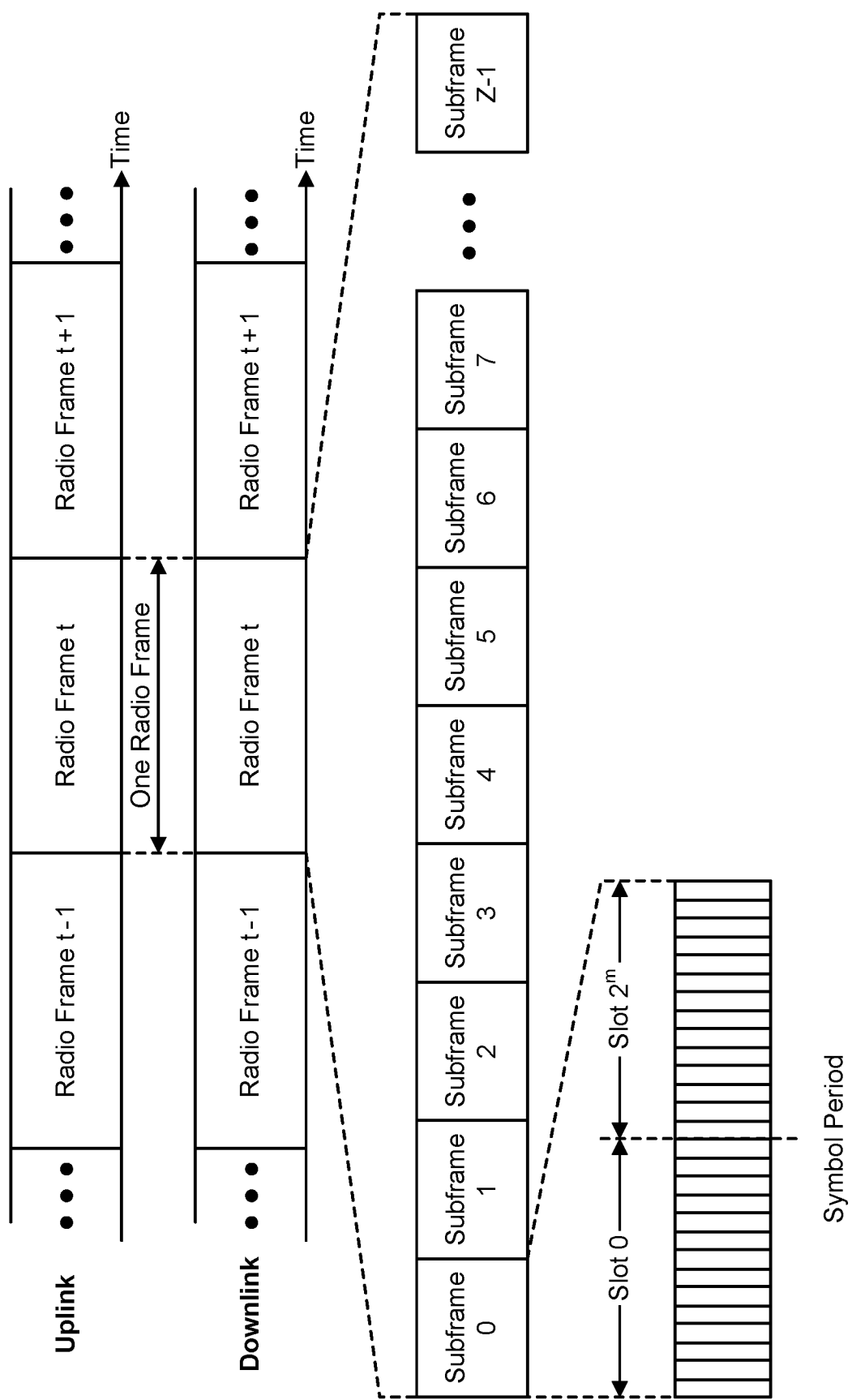
FIG. 3 is a diagram illustrating an example of a frame structure for use in a wireless network in accordance with various aspects of the present disclosure.

FIG. 3 is a diagram illustrating an example of a frame structure for use in a wireless network in accordance with various aspects of the present disclosure. For example, the frame structure may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, among other examples, or combinations thereof). Each slot may include a set of L symbol periods. For example, each slot may include fourteen symbol periods (for example, as shown in FIG. 3), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, or symbol-based, among other examples, or combinations thereof.

While some techniques are described herein in connection with frames, subframes, or slots, among other examples, or combinations thereof, these techniques may equally apply to other types of wireless communication structures, which may be referred to using terms other than "frame," "subframe," or "slot" in 5G NR. In some aspects, "wireless communication structure" may refer to a periodic time-bounded communication unit defined by a wireless communication standard or protocol. Additionally or alternatively, different configurations of wireless communication structures than those shown in FIG. 3 may be used.

In some telecommunications (for example, NR), a base station may transmit synchronization signals. For example, a base station may transmit a primary synchronization signal (PSS) or a secondary synchronization signal (SSS) on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks (SSBs)).

Figure 4:
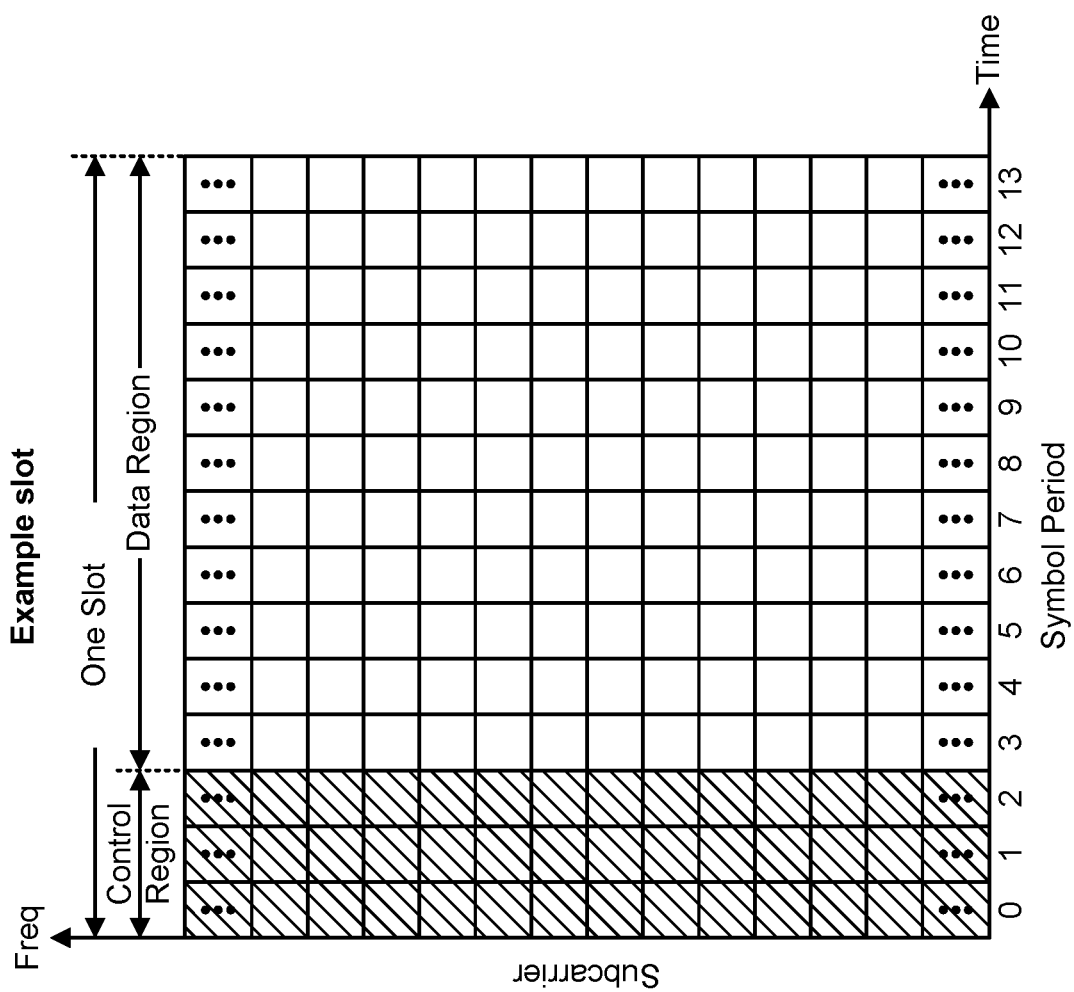
FIG. 4 is a diagram illustrating an example of a slot format in accordance with various aspects of the present disclosure.

FIG. 4 is a diagram illustrating an example of a slot format in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple base stations. One of these base stations may be selected to serve the UE. The serving base station may be selected based at least in part on various criteria such as received signal strength, received signal quality, or path loss, among other examples, or combinations thereof. Received signal quality may be quantified by a signal-to-interference-plus-noise ratio (SINR), a reference signal received quality (RSRQ), or some other metric. The UE may operate in a dominant interference scenario in which the UE may observe high interference from one or more interfering base stations.

While aspects of the examples described herein may be associated with NR or 5G technologies, aspects of the present disclosure may be applicable with other wireless communication systems. New radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported, and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such central units or distributed units.

Figure 5:
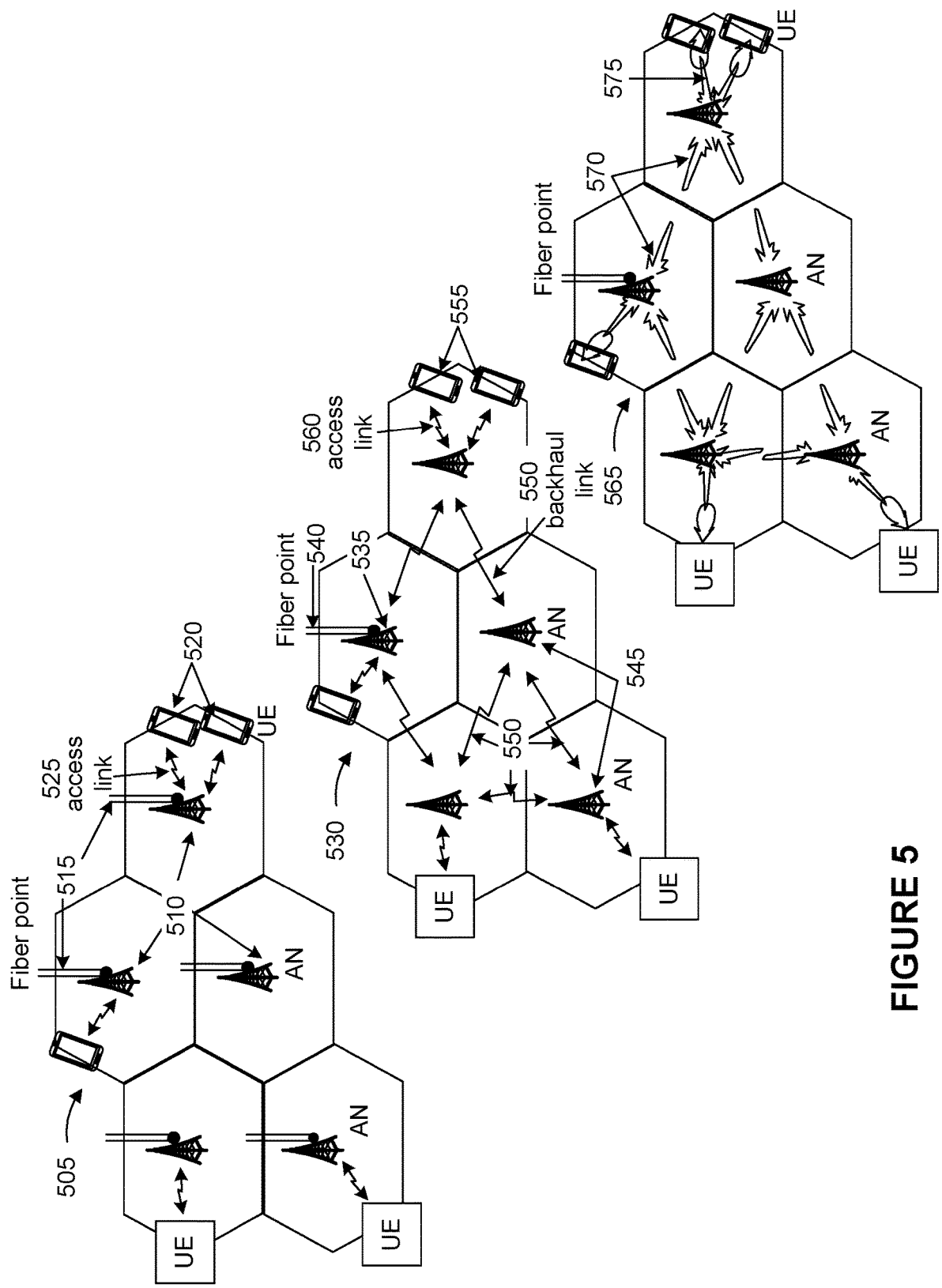
FIG. 5 is a diagram illustrating examples of radio access networks in accordance with various aspects of the present disclosure.

FIG. 5 is a diagram illustrating examples of radio access networks in accordance with various aspects of the disclosure. As shown in FIG. 5, a radio access network (RAN) may include a RAN 505, such as a 3G RAN, a 4G RAN, an LTE RAN, or a 5G NR RAN, among other examples. The RAN 505 may include multiple base stations 510 or access nodes (AN) 510, where each base station 510 or AN 510 communicates with a core network via a wired backhaul link 515, such as a fiber connection. A base station 510 or AN 510 may communicate with a UE 520 via a wireless access link 525. In some aspects, a base station 510 or AN 510 shown in FIG. 5 may be an example of a base station 110 described with reference to FIG. 1 or FIG. 2. In some aspects, a UE 520 shown in FIG. 5 may be an example of a UE 120 described with reference to FIG. 1 or FIG. 2.

As further shown in FIG. 5, the RAN 505 may include a wireless backhaul network 530, sometimes referred to as an integrated access and backhaul (IAB) network. In an IAB network, at least one base station is an anchor base station 535 that communicates with a core network via a wired backhaul link 540, such as a fiber connection. An anchor base station 535 may also be referred to as an IAB donor (or IAB-donor). The IAB network 530 also includes one or more non-anchor base stations 545, sometimes referred to as relay base stations or IAB nodes (or IAB-nodes). A non-anchor base station 545 may communicate directly or indirectly with the anchor base station 535 via one or more wireless backhaul links 550 (for example, via one or more other non-anchor base stations 545) to form a backhaul path to the core network for carrying backhaul traffic. Anchor base station(s) 535 or non-anchor base station(s) 545 may communicate with one or more UEs 555 via wireless access links 560 carrying access traffic. In some aspects, an anchor base station 535 or a non-anchor base station 545 shown in FIG. 5 may be an example of a base station 110 described with reference to FIG. 1 or FIG. 2. In some aspects, a UE 555 shown in FIG. 5 may be an example of a UE 120 as described with reference to FIG. 1 or FIG. 2.

As further shown in FIG. 5, a RAN may include an IAB network 565 that may utilize millimeter wave (mmW) technology for directional communications (for example, via beamforming) between base stations or UEs (for example, between two base stations, between two UEs, or between a base station and a UE). For example, mmW wireless backhaul links 570 between base stations may enable a base station to direct signals carrying information toward a target base station using beamforming. Similarly, the wireless access links 575 between a UE and a base station may enable the UE or the based station to transmit beamformed mmW signals toward a target wireless node, such as a base station or a UE. In this way, inter-link interference may be reduced.

The configuration of base stations and UEs shown in FIG. 5 is an example, and other examples are contemplated. For example, one or more base stations illustrated in FIG. 5 may be replaced by one or more UEs that communicate via a UE-to-UE access network (for example, a peer-to-peer network or a device-to-device network) via sidelinks between the UEs, the resources for which may be allocated by an associated base station. In such examples, an anchor node may refer to a UE in direct communication with a base station, such as an anchor base station or a non-anchor base station.

Figure 6:
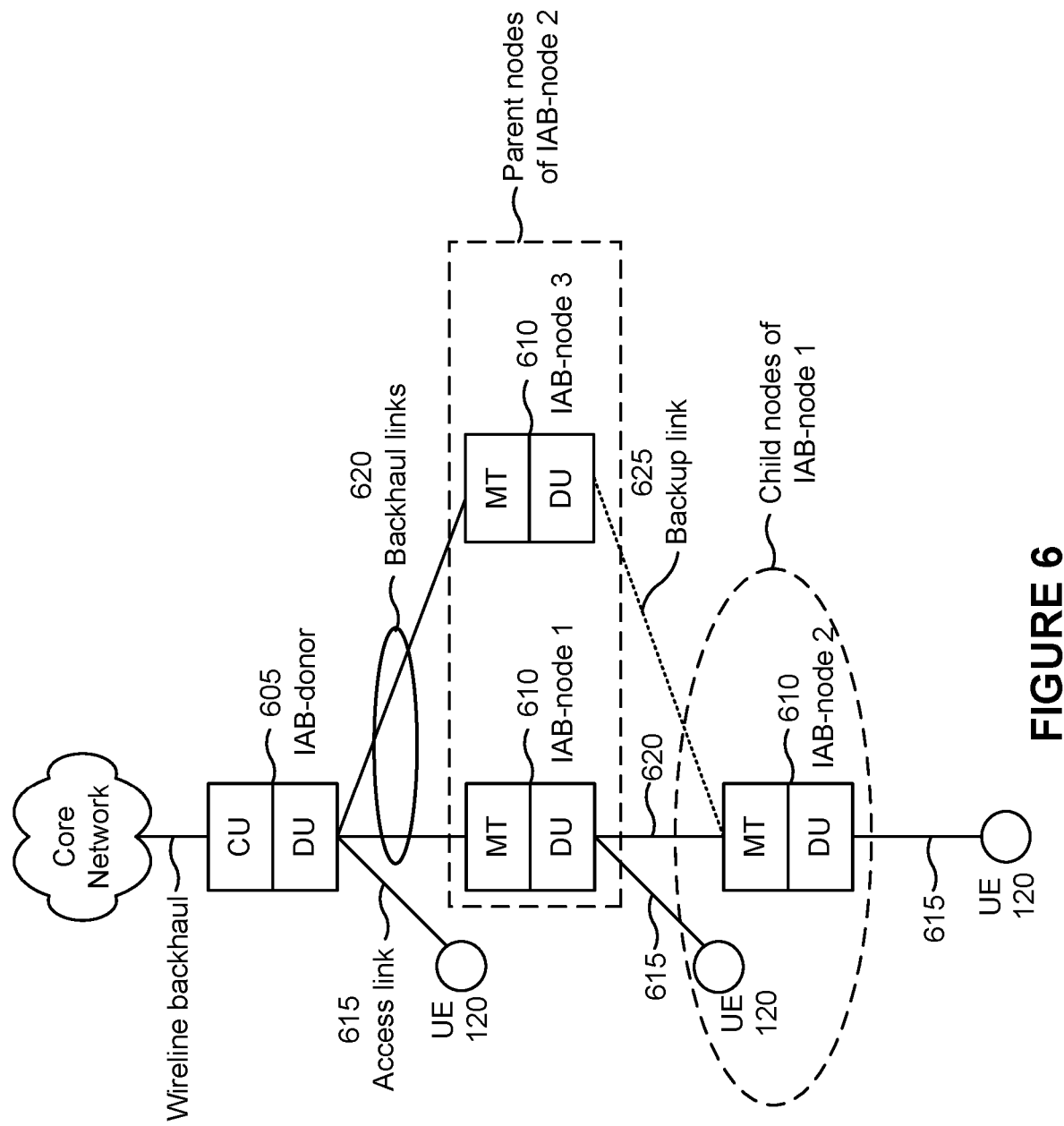
FIG. 6 is a diagram illustrating an example of an integrated access and backhaul network architecture in accordance with various aspects of the present disclosure.

FIG. 6 is a diagram illustrating an example of an IAB network architecture in accordance with various aspects of the disclosure. As shown in FIG. 6, an IAB network may include an IAB donor 605 (shown as IAB-donor) that connects to a core network via a wired connection (shown as a wireline backhaul). For example, an Ng interface of the IAB donor 605 may terminate at the core network. Additionally or alternatively, the IAB donor 605 may connect to one or more devices of the core network that provide a core access and mobility management function (for example, an access and mobility management function (AMF) entity). In some aspects, the IAB donor 605 may include a base station 110, such as an anchor base station, as described above in connection with FIG. 5. As shown, the IAB donor 605 may include a central unit (CU), which may perform access node controller (ANC) functions or AMF functions, among other examples. In some aspects, the CU may configure a distributed unit (DU) of the IAB donor 605 or may configure one or more IAB nodes 610 (for example, an MT or a DU of an IAB node 610) that connect to the core network via the IAB donor 605. Accordingly, a CU of an IAB donor 605 may control or configure the entire IAB network that connects to the core network via the IAB donor 605, such as by using control messages or configuration messages, such as radio resource control (RRC) configuration messages or F1 application protocol (F1AP) messages, among other examples.

As further shown in FIG. 6, the IAB network may include IAB nodes 610 (shown as IAB-node 1, IAB-node 2, and IAB-node 3) that connect to the core network via the IAB donor 605. As shown, an IAB node 610 may include mobile termination (MT) functions (sometimes referred to as UE functions (UEF)) and may include DU functions (sometimes referred to as access node functions (ANF)). The MT functions of an IAB node 610 (for example, a child node) may be controlled or scheduled by another IAB node 610 (for example, a parent node of the child node) or an IAB donor 605. In some aspects, the DU functions of an IAB node 610 (for example, a parent node) may control or schedule other IAB nodes 410 (for example, child nodes of the parent node) or UEs 120. Accordingly, in some aspects, a DU may be referred to as a scheduling node or a scheduling component, and an MT may be referred to as a scheduled node or a scheduled component. In some aspects, an IAB donor 605 may include DU functions and not MT functions. That is, an IAB donor 605 may configure, control, or schedule communications of IAB nodes 610 or UEs 120. A UE 120 may include only MT functions, and not DU functions. That is, communications of a UE 120 may be controlled or scheduled by an IAB donor 605 or an IAB node 610 (for example, a parent node of the UE 120).

In some aspects, when a first node controls or schedules communications for a second node (for example, when the first node provides DU functions for MT functions of the second node), the first node may be referred to as a parent node of the second node, and the second node may be referred to as a child node of the first node. A child node of the second node may be referred to as a grandchild node of the first node. Thus, a DU function of a parent node may control or schedule communications for child nodes of the parent node. A parent node may be an IAB donor 605 or an IAB node 610, and a child node may be an IAB node 610 or a UE 120. Communications of an MT function of a child node may be controlled or scheduled by a parent node of the child node.

As further shown in FIG. 6, a link between a UE 120 that has only MT functions and not DU functions and an IAB donor 605, or between a UE 120 and an IAB node 610, may be referred to as an access link 615. Access link 615 may be a wireless access link that provides a UE 120 with radio access to a core network via an IAB donor 605, and optionally via one or more IAB nodes 610. Thus, the network illustrated in FIG. 6 may be referred to as a multi-hop network or a wireless multi-hop network.

As further shown in FIG. 6, a link between an IAB donor 605 and an IAB node 610 or between two IAB nodes 610 may be referred to as a backhaul link 620, which may be a wireless backhaul link that provides an IAB node 610 with radio access to a core network via an IAB donor 605, and optionally via one or more other IAB nodes 610. In some aspects, a backhaul link 620 may be a primary backhaul link or a secondary backhaul link (for example, a backup backhaul link). In some aspects, a secondary backhaul link may be used in the event that a primary backhaul link fails, becomes congested, or becomes overloaded, among other examples. For example, a backup link 625 between IAB-node 2 and IAB-node 3 may be used for backhaul communications based at least in part on a primary backhaul link between IAB-node 2 and IAB-node 1 failing. As used herein, a node or a wireless node may refer to an IAB donor 605 or an IAB node 610.

In an IAB network, network resources for wireless communications (for example, time resources, frequency resources, or spatial resources) may be shared between access links 615 and backhaul links 620. In some cases, a CU of an IAB donor 605 may configure resource patterns for IAB nodes 610 in the IAB network. For example, a time resource (for example, a slot or a symbol) may be configured as downlink-only, uplink-only, flexible, or not available (or "unavailable"). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for either downlink communications or uplink communications of the wireless node. When a time resource is configured as not available for a wireless node, that time resource may not be used for any communications of the wireless node.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node, such as a DU of the parent node. For example, the parent node may explicitly or implicitly indicate whether a soft time resource is available for communications of the wireless node. Accordingly, a soft time resource may be in one of two states: a schedulable state (for example, when the soft time resource is available for scheduling or communications of the wireless node) and a non-schedulable state (for example, when the soft time resource is not available for scheduling and is not available for communications of the wireless node). For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

FIGS. 7A-7C are diagrams illustrating examples of full-duplex communication in accordance with various aspects of the present disclosure. As shown in FIGS. 7A-7C, full-duplex communication may be performed in a wireless network between one or more upstream wireless nodes 710 (such as one or more base stations, TRPs, parent IAB nodes, or DUs of an IAB node, among other examples) and one or more downstream wireless nodes (such as one or more UEs, child IAB nodes, or MTs of an IAB node, among other examples). For example, in FIGS. 7A-7C, the one or more upstream wireless nodes 710 are illustrated as base stations or TRPs, and the one or more downstream wireless nodes 720 are illustrated as one or more UEs. However, the devices shown in FIGS. 7A-7C are examples only, and full-duplex communication may be supported in a wireless network between other suitable devices (for example, between an MT node and a control node, between an IAB child node and an IAB parent node, or between a scheduled node and a scheduling node, among other examples).

As shown in FIG. 7A, a downstream wireless node 720 may be in communication with two upstream wireless nodes 710-1, 710-2. As shown in FIG. 7A, the downstream wireless node 720 may transmit one or more uplink transmissions to upstream wireless node 710-1 and may concurrently receive one or more downlink transmission from upstream wireless node 710-2. Accordingly, in the example shown in FIG. 7A, full-duplex communication is enabled for the downstream wireless node 720, which may be operating as a full-duplex node, but not for the upstream wireless nodes 710-1, 710-2, which may be operating as half-duplex nodes. Additionally or alternatively, as shown in FIG. 7B, two downstream wireless nodes 720-1 and 720-2 are in communication with an upstream wireless node 710. In such example, the upstream wireless node 710 may transmit one or more downlink transmissions to a first downstream wireless node 720-1 and may concurrently receive one or more uplink transmissions from a second downstream wireless node 720-2. Accordingly, in the example shown in FIG. 7B, full-duplex communication is enabled for the upstream wireless node 710, which may be operating as a full-duplex node, but not for the downstream wireless nodes 720-1 and 720-2, which may be operating as half-duplex nodes. Additionally or alternatively, as shown in FIG. 7C, a downstream wireless node 720 may be in communication with an upstream wireless node 710. In such example, the upstream wireless node 710 may transmit, and the downstream wireless node 720 may receive, one or more downlink transmissions concurrently with the downstream wireless node 720 transmitting, and the upstream wireless node 710 receiving, one or more uplink transmissions. Accordingly, in the example shown in FIG. 7C, full-duplex communication is enabled for both the downstream wireless node 720 and the upstream wireless node 710, each of which is operating as a full-duplex node.

The present disclosure generally relates to improving a manner in which flexible time-division duplexing (TDD) operates to support full-duplex communication, which generally refers to simultaneous uplink and downlink transmissions. For example, in some cases, nodes in an IAB network are subject to a half-duplex constraint, meaning that a particular node cannot transmit and receive information at the same time (for example, cannot concurrently or simultaneously communicate via an access link and a backhaul link, or cannot concurrently or simultaneously communicate via an uplink and a downlink, among other examples). This constraint may lead to high latency or reduced throughput, among other examples. Accordingly, in some cases, to reduce latency, increase throughput, or improve reliability, nodes in an IAB network may support full-duplex communication capabilities, which refers to simultaneous transmit and receive operations (for example, simultaneous uplink and downlink operations at a particular frequency). However, a control node may be unable to signal, to a wireless node (for example, a parent IAB node), a slot configuration that includes one or more slots or symbols that may be used for full-duplex communication with another wireless node (for example, a child of the wireless node). For example, existing slot formats generally have a structure in which slots or symbols can be labelled as downlink-only, uplink-only, or flexible (downlink or uplink, but not both). Accordingly, even if the wireless nodes support full-duplex communication, the control node may be unable to configure a slot configuration, for a wireless communication link between the wireless nodes, that enables the full-duplex communication capabilities to be utilized. As result, there may be decreased throughput on the wireless communication link or increased latency on the wireless communication link, among other examples.

Various aspects generally relate to providing a wireless node with a slot format configuration to support full-duplex operation between the wireless node and another wireless node. Some aspects more specifically relate to a control node (for example, a base station, an IAB donor, or a parent IAB node) providing, to a wireless node, a slot format configuration that the wireless node may use to perform full-duplex communication with another wireless node, such as a child of the wireless node. For example, the control node may transmit, to the wireless node, one or more signaling messages that explicitly indicate one or more slots or symbols configured to support full-duplex operation. Additionally or alternatively, the one or more signaling messages may include one or more signaling messages in which one or more slots or symbols are labelled as downlink-only or uplink-only, and a subsequent signaling message may relabel the downlink-only slots or symbols as uplink or flexible slots or symbols or relabel the uplink-only slots or symbols as downlink or flexible slots or symbols to implicitly indicate the slots or symbols that are configured to support full-duplex operation. Accordingly, in some aspects, the wireless node may use the slot format configuration to communicate with another wireless node (for example, a child of the wireless node) in the slots or symbols configured to support full-duplex operation. Furthermore, in some aspects, the wireless node may apply one or more rules to selectively perform full-duplex operations in the slots or symbols labelled as full-duplex or flexible, to perform half-duplex operations in a direction that conflicts with a symbol type (for example, to perform downlink communications in an uplink symbol or uplink communications in a downlink symbol), or to perform full-duplex operations in one or more symbols or slots that are labelled as uplink or downlink-only.

Particular aspects of the subject matter described in this disclosure can be implemented to realize one or more of the following potential advantages. In some examples, the described techniques can be used to enable the wireless node to simultaneously perform uplink communication and downlink communication in full-duplex, flexible, downlink-only, or uplink-only slots or symbols. In some examples, the described techniques can be used to provide the wireless node with flexibility to perform half-duplex operations in an opposite direction from a scheduled slot or symbol type. In this way, the wireless node may transmit and receive a greater quantity of communications relative to slots or symbols that are limited to uplink-only or downlink-only, which increases throughput on the wireless communication link between the wireless node and the other wireless node. Moreover, the capability to perform full-duplex communication decreases the amount of time that a communication has to be delayed before the communication can be transmitted to or received by the wireless node, which decreases latency on the wireless communication link. In addition, the described techniques can be used to increase flexibility in scheduling communications for the wireless node (for example, by providing a slot format configuration that enables scheduling full-duplex communications or half-duplex communications that are not constrained to a downlink or an uplink direction, among other examples).

Figure 8:
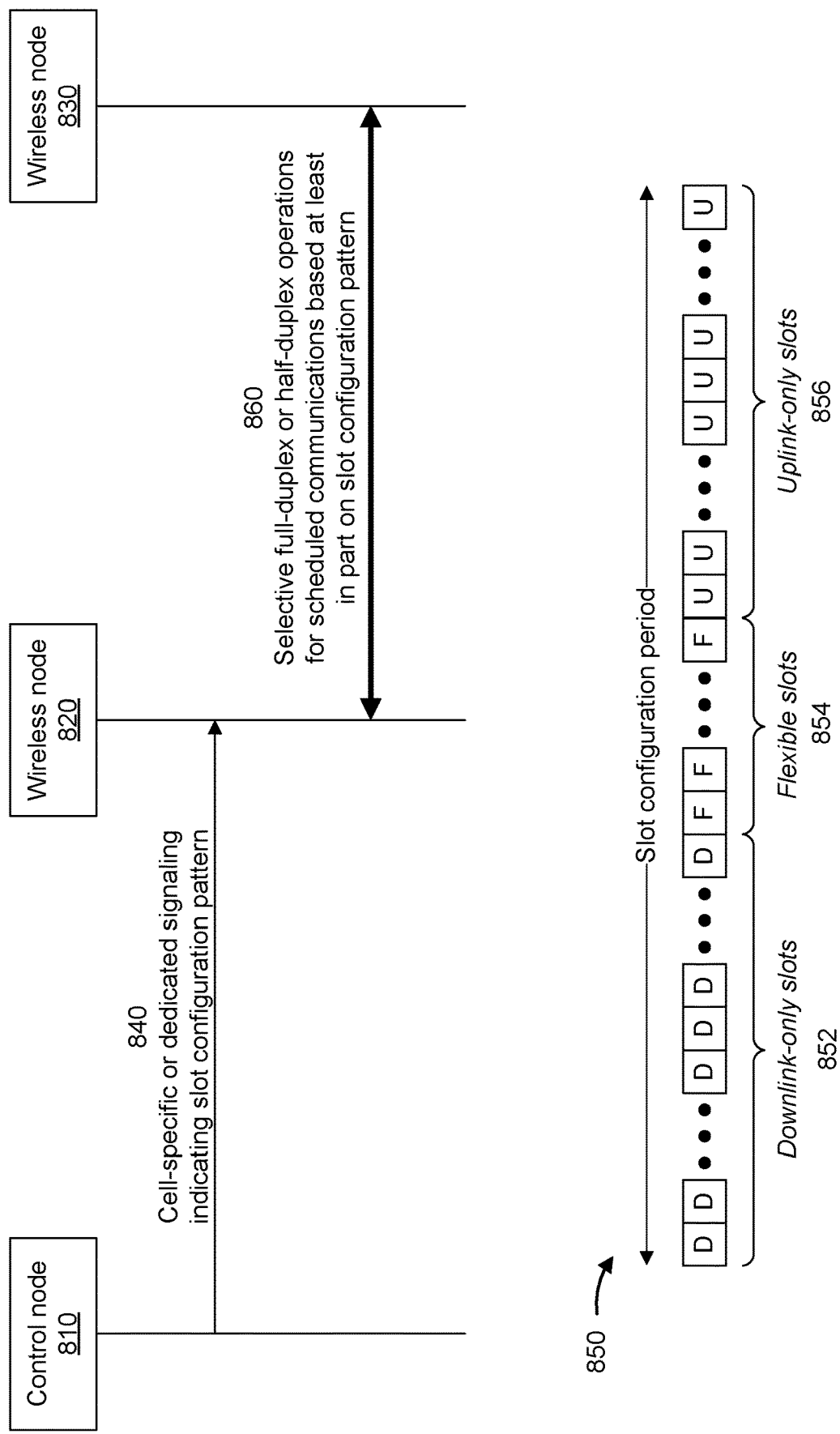
FIG. 8 is a diagram illustrating an example associated with providing a slot format configuration to support full-duplex operation in accordance with various aspects of the present disclosure.

FIG. 8 is a diagram illustrating an example associated with providing a slot format configuration to support full-duplex operation in accordance with various aspects of the present disclosure. In the example shown in FIG. 8, a control node 810 (for example, a base station, a CU, or an IAB donor) may provide the slot format configuration supporting full-duplex operation to a wireless node 820, which may use the slot format configuration to communicate on a wireless link with another wireless node 830, such as a child of the wireless node 820. For example, in some aspects, the wireless node 830 may be a UE, the wireless node 820 may be a base station or an IAB node, and the wireless link between the wireless node 820 and the wireless node 830 may be an access link, as for example, each of these is described with reference to FIGS. 1-7 above. Additionally or alternatively, in some aspects, the wireless node 830 may be a child IAB node, the wireless node 820 may be a parent IAB node or an IAB donor, and the wireless link between the wireless node 820 and the wireless node 830 may be a backhaul link or a backup link, among other examples, as described above. Furthermore, as described herein, the wireless nodes 820, 830 may support full-duplex communication with one another, which generally refers to a capability of the wireless node 830 to simultaneously transmit information on an uplink and receive information on a downlink, or a capability of the wireless node 820 to simultaneously transmit information on a downlink and receive information on an uplink, among other examples.

As indicated in FIG. 8, in a first operation 840, the control node 810 may transmit, and the wireless node 820 may receive, cell-specific or dedicated signaling indicating a slot configuration pattern. In some aspects, as described herein, the slot configuration pattern indicated in the cell-specific or dedicated signaling may include one or more slots or symbols that support full-duplex communication.

For example, in some aspects, the cell-specific signaling may include radio resource control (RRC) signaling that includes one or more parameters to define a semi-static slot configuration pattern in a cell associated with the control node 810 or the wireless node 820. For example, the one or more parameters may include a common time division duplexing (TDD) configuration to be used in the cell, which the control node 810 or the wireless node 820 may broadcast via a system information block (SIB). In some aspects, the common TDD configuration may include a slot configuration period and a reference subcarrier spacing (SCS) that may define a quantity of slots in the slot configuration period. Furthermore, in some aspects, the common TDD configuration may indicate the slot configuration pattern associated with the cell. For example, the slot configuration pattern may include a quantity of fully-downlink slots that include only downlink symbols ($d_{slots}$), a quantity of downlink-only symbols ($d_{sym}$), a quantity of fully-uplink slots that include only uplink symbols ($u_{slots}$), a quantity of uplink-only symbols ($u_{sym}$), or a quantity of flexible symbols, among other examples. For example, as shown in FIG. 8, a slot configuration period 850 may be configured in accordance with a pattern in which the slot configuration period 850 includes a set of one or more downlink-only slots 852 each including a set of one or more downlink-only symbols, a set of one or more flexible slots 854 each including a set of one or more flexible symbols, and a set of one or more uplink-only slots 856 each including a set of one or more uplink-only symbols. Furthermore, in some aspects, the control node 810 may configure multiple slot configuration patterns, in which case the multiple slot configuration patterns may be concatenated. Furthermore, in some aspects, the slot configuration period may be configured in accordance with other suitable patterns.

Additionally or alternatively, the common TDD configuration may explicitly indicate one or more slots or symbols that are configured to support full-duplex communications, and one or more rules may be used to define a placement of the full-duplex slots or symbols within the slot configuration period (for example, at the start of the slot configuration period, the end of the slot configuration period, or the middle of the slot configuration period). Additionally or alternatively, the slots or symbols that are configured to support full-duplex communications may be explicitly or implicitly indicated in subsequent (for example, dedicated) signaling for the wireless node 820.

For example, in some aspects, the dedicated signaling may include dedicated RRC signaling for the wireless node 820 or a slot format indicator (SFI) carried in downlink control information (DCI). Accordingly, the dedicated RRC signaling may include a dedicated TDD configuration for the wireless node 820 that may override one or more flexible symbols provided by the common TDD configuration. In some examples, the SFI carried in the DCI may include one or more slot format combinations that may override one or more flexible symbols provided by the common TDD configuration or the dedicated RRC signaling (for example, each slot format combination may include a series of slot formats for a quantity of slots). For example, in the dedicated signaling, one or more flexible symbols may be relabeled as downlink symbols, uplink symbols, or full-duplex symbols.

Accordingly, when the symbols that are configured to support full-duplex communications are explicitly indicated, the symbols may be labeled as full-duplex ("FD") in the common TDD configuration, the dedicated RRC signaling, or the SFI carried in the DCI. For example, in order to provide backward-compatibility, the full-duplex symbols may not be indicated in the common TDD configuration, which may be received by legacy UEs, child nodes, or other devices that lack full-duplex capabilities, and the full-duplex symbols may be explicitly indicated only in the dedicated RRC signaling or the SFI carried in the DCI for the wireless node 820 that has full-duplex capabilities. Additionally or alternatively, the full-duplex symbols may not be indicated in the common TDD configuration or the dedicated RRC signaling, and may be explicitly indicated only in the SFI carried in the DCI for the wireless node 820 that has full-duplex capabilities. Additionally or alternatively, in some cases, the full-duplex symbols may be explicitly indicated in any of the common TDD configuration, the dedicated RRC signaling, or the SFI carried in the DCI for the wireless node 820.

Additionally or alternatively, the dedicated signaling may implicitly indicate one or more symbols that can be used for full-duplex communications. For example, to implicitly indicate that a symbol can be used for full-duplex communications, the dedicated signaling may relabel a downlink symbol as an uplink symbol or a flexible symbol or may relabel an uplink symbol as a downlink symbol or a flexible symbol. For example, the common TDD configuration may initially indicate that a symbol is a downlink-only or an uplink-only symbol and the dedicated signaling or SFI may relabel the symbol as an uplink/flexible symbol or a downlink/flexible symbol to implicitly indicate that the symbol is configured for full-duplex communications. In another example, the common TDD configuration or the dedicated RRC signaling may initially indicate that a symbol is a downlink-only or an uplink-only symbol and the SFI may relabel the symbol as an uplink/flexible symbol or a downlink/flexible symbol to implicitly indicate that the symbol is configured for full-duplex communications.

As further indicated in FIG. 8, in a second operation 860, the wireless node 820 and the wireless node 830 may selectively perform full-duplex or half-duplex operations for scheduled communications based at least in part on the slot configuration pattern indicated in the cell-specific or dedicated signaling. For example, in some aspects, the wireless node 820 may indicate the slot configuration pattern to the wireless node 830 in a similar manner as described above, and the wireless nodes 820, 830 may be configured to apply one or more rules to determine how to handle scheduled communications based on a combination of parameters provided in the cell-specific or dedicated signaling. For example, if one or more symbols indicated to be flexible symbols in the common TDD configuration or the dedicated RRC signaling are also indicated to be flexible symbols in the SFI, then the wireless nodes 820, 830 may cancel transmit and receive operations for one or more uplink or downlink communications that are semi-statically configured (for example, via an RRC configuration) in such flexible symbols. In this way, by indicating the symbols to be flexible in multiple signaling messages, the control node 810 may implicitly cancel semi-static communications that were previously scheduled, which may enable the symbols to instead be used for interference management, or power saving for the wireless node 820 or the wireless node 830. In another example, if one or more symbols are indicated to be flexible symbols in the common TDD configuration or the dedicated RRC signaling and the wireless node 820 is provided with an SFI that indicates the symbols to be downlink-only symbols, then semi-static uplink communications within such symbols may be cancelled. Similarly, if symbols indicated to be flexible symbols in the common TDD configuration or the dedicated RRC signaling are subsequently indicated in an SFI to be uplink-only symbols, then semi-static downlink communications within such symbols may be cancelled.

Furthermore, as described herein, the wireless nodes 820, 830 may be configured to apply one or more rules to selectively perform full-duplex operations for communications that are scheduled on full-duplex symbols, downlink-only symbols, uplink-only symbols, or flexible symbols, and to selectively perform half-duplex operations in a direction that conflicts with a symbol type (for example, to perform an uplink communication in a symbol scheduled as a downlink-only symbol or to perform a downlink communication in a symbol scheduled as an uplink-only symbol).

For example, when a full-duplex communication is scheduled in a full-duplex symbol, the wireless node 830 may be configured to simultaneously transmit an uplink communication to the wireless node 820 and receive a downlink communication from the wireless node 720 for both dynamically scheduled communications and semi-statically scheduled communications. However, in some cases, full-duplex communication capabilities may be dynamic or conditional, meaning that a capability of the wireless node 820 or the wireless node 830 to simultaneously transmit and receive may change over time. For example, the wireless node 820 or the wireless node 830 may support full-duplex communications using a first beam pair that includes a first transmit beam and a first receive beam, but another beam pair that includes a second transmit beam or a second receive beam may fail to satisfy one or more conditions (for example, a performance metric). This may occur due to cluster echo issues, where there may be a strong reflector in a particular beam direction that may cause a transmitted signal to be reflected back to the receive beam. In another example, an ability of the wireless node 820 or the wireless node 830 to perform full-duplex operations may depend on a capability of the wireless node 820 or the wireless node 830 to create simultaneous beams and process the transmitted and received signals (for example, the wireless node 820 or the wireless node 830 may lack a capability to create simultaneous beams and process the transmitted and received signals on a single antenna array, but the wireless node 820 or the wireless node 830 may have capabilities to create simultaneous beams and process the transmitted and received signals node from separate arrays or panels). Furthermore, in another example, a required link budget or a desired transmit or receive power may impact a capability of the wireless node 820 or the wireless node 830 to perform full-duplex operations.

Accordingly, in cases where a capability of the wireless node 820 or the wireless node 830 to simultaneously transmit and receive in a particular full-duplex symbol fails to satisfy one or more conditions, the wireless nodes 820, 830 may selectively perform half-duplex or modified full-duplex communications in the full-duplex symbol in accordance with one or more prioritization rules. For example, in some aspects, priority may be given to an uplink communication if the original symbol type was an uplink symbol that was subsequently relabeled as a downlink or flexible symbol (for example, the full-duplex symbol was implicitly indicated by the relabeling). Alternatively, priority may be given to a downlink communication if the original symbol type was a downlink symbol that was subsequently relabeled as an uplink or flexible symbol. In other examples, where the scheduled uplink and downlink communications include one dynamically scheduled communication and one semi-statically communication, priority may be given to the dynamically scheduled communication, or priority may be determined based at least in part on respective times when the uplink and downlink communications were scheduled (for example, priority may be given to the communication that was scheduled earlier or the communication that was scheduled later), or priority may be determined based at least in part on respective signal types associated with the uplink communication and the downlink communication (for example, prioritizing a downlink SSB over an uplink scheduling request (SR) or physical uplink shared channel (PUSCH)). Additionally or alternatively, the wireless nodes 820, 830 may apply one or more policies, rules, or internal logic to determine whether to prioritize the uplink communication or the downlink communication.

In the above examples, the lower priority communication may be cancelled or modified, and the wireless node 830 may send an uplink signal to the wireless node 820 to indicate that the lower priority communication was cancelled or modified, and the uplink signal may be transmitted before or after the symbol in which the lower priority communication is scheduled. For example, the uplink signal may include uplink control information (UCI) or a medium access control (MAC) control element (MAC-CE). Furthermore, in cases in which the lower priority is modified (for example, the wireless node 830 performs full-duplex operations but modified one or more communication parameters for the lower priority communication), the uplink signal may indicate the one or more communication parameters that were modified for the lower priority communication (for example, a reduced transmit power or a change to a transmit beam or a receive beam, among other examples).

In some aspects, when one or more communications are scheduled in an uplink symbol or a downlink symbol, the wireless nodes 820, 830 may perform the one or more communications based at least in part on a direction of the one or more communications and whether half-duplex operation or full-duplex operation is scheduled. For example, if a half-duplex uplink communication is scheduled in an uplink symbol, or a half-duplex downlink communication is scheduled in a downlink symbol, the wireless nodes 820, 830 may perform the half-duplex communication as scheduled. However, the wireless nodes 820, 830 may be configured with different behavior if a half-duplex communication is scheduled in a direction opposite to the symbol type (for example, where an uplink communication is scheduled in a downlink symbol, or a downlink communication is scheduled in an uplink symbol) or a full-duplex communication is scheduled in an uplink-only symbol or a downlink-only symbol.

For example, in cases in which a half-duplex communication is scheduled in a direction opposite to the symbol type, the half-duplex communication may be performed only for dynamically-scheduled communications. Otherwise, if the half-duplex communication is semi-statically scheduled, the half-duplex communication may be cancelled. Alternatively, in some aspects, the half-duplex communication may be performed for dynamically scheduled communications or semi-statically scheduled communications. Additionally or alternatively, the wireless nodes 820, 830 may apply one or more policies, rules, or internal logic to determine whether to perform the half-duplex communication. For example, one or more of the wireless nodes 820, 830 may determine to not perform the half-duplex communication if one or more communications are scheduled with another node, or if the symbol in which the conflicting half-duplex communication is scheduled is used for another purpose, such as obtaining measurements or performing a self-calibration, among other examples. In such examples, the wireless node 830 may send an uplink signal to the wireless node 820 to indicate whether the half-duplex communication is performed, and the uplink signal may be transmitted before or after the symbol in which the half-duplex communication is scheduled to be performed. For example, the uplink signal may include UCI or a MAC-CE, among other examples.

In some aspects, in cases in which a full-duplex communication (including simultaneous uplink and downlink communications) is scheduled in an uplink-only or a downlink-only symbol, the full-duplex communication may be performed only for dynamically-scheduled communications. Alternatively, in some aspects, the full-duplex communication may be performed for dynamically-scheduled communications or semi-statically scheduled communications. Additionally or alternatively, the wireless nodes 820, 830 may selectively perform the full-duplex communication depending on whether a simultaneous transmit and receive capability satisfies a condition (for example, a performance metric that relates to cluster echo, a capability of the wireless nodes 820, 830 to create simultaneous beams and process the transmitted and received signals the same antenna array or different arrays or panels, a required link budget, or a desired transmit or receive power, among other examples). Accordingly, in cases in which the simultaneous transmit and receive capability of one or more of the wireless nodes 820, 830 fails to satisfy the condition, the wireless node 820 or the wireless node 830 may assign a higher priority to either the uplink communication or the downlink communication. For example, in some aspects, the higher priority may be given to the uplink communication if the symbol is an uplink-only symbol, or the higher priority may be given to the downlink communication if the symbol is a downlink-only symbol. In other examples, where the scheduled uplink and downlink communications include one dynamically-scheduled communication and one semi-statically communication, the higher priority may be given to the dynamically-scheduled communication, or the higher priority may be determined based at least in part on respective times when the uplink and downlink communications were scheduled (for example, priority may be given to the communication that was scheduled earlier or the communication that was scheduled later), or the higher priority may be determined based at least in part on respective signal types associated with the uplink communication and the downlink communication (for example, prioritizing a downlink SSB over an uplink SR or PUSCH). Additionally or alternatively, the wireless node 820 or the wireless node 830 may apply one or more policies, rules, or internal logic to determine whether to prioritize the uplink communication or the downlink communication.

In the above examples, the lower priority communication may be cancelled or modified, and the wireless node 830 may send an uplink signal to the wireless node 820 to indicate that the lower priority communication was cancelled or modified, and the uplink signal may be transmitted before or after the symbol in which the lower priority communication is scheduled. For example, the uplink signal may include UCI or a MAC-CE, among other examples. Furthermore, in cases where the lower priority is modified (for example, the wireless node 830 performs both the uplink communication and the downlink communication but modified one or more communication parameters for the lower priority communication), the uplink signal may indicate the one or more communication parameters that were modified for the lower priority communication (for example, a reduced transmit power or a change to a transmit beam or a receive beam).

In some aspects, in cases in which a full-duplex communication (including simultaneous uplink and downlink communications) is scheduled in a flexible symbol and an SFI is either not provided by the control node 810 or SFI provided by the control node 810 again labels the flexible symbol as a flexible symbol, the full-duplex communication may be performed for dynamically-scheduled communications or semi-statically scheduled communications, or the full-duplex communication may be performed only for dynamically-scheduled communications. Additionally or alternatively, the wireless nodes 820, 830 may selectively perform the full-duplex communication depending on whether a simultaneous transmit and receive capability satisfies a condition. For example, where the scheduled uplink and downlink communications include one dynamically-scheduled communication and one semi-statically communication, a higher priority may be given to the dynamically-scheduled communication, or the higher priority may be determined based at least in part on respective times when the uplink and downlink communications were scheduled (for example, priority may be given to the communication that was scheduled earlier or the communication that was scheduled later), or the higher priority may be determined based at least in part on respective signal types associated with the uplink communication and the downlink communication (for example, prioritizing a downlink SSB over an uplink SR or PUSCH). Additionally or alternatively, where the control node 810 provides an SFI to relabel a flexible symbol as a downlink-only or uplink-only symbol, the higher priority may be given to the uplink communication if the SFI relabeled the symbol as an uplink-only symbol, or the higher priority may be given to the downlink communication if the SFI relabeled the symbol as a downlink-only symbol. Additionally or alternatively, the wireless nodes 820, 830 may apply one or more policies, rules, or internal logic to determine whether to prioritize the uplink communication or the downlink communication.

In the above examples, the lower priority communication may be cancelled or modified, and the wireless node 830 may send an uplink signal to the wireless node 820 to indicate that the lower priority communication was cancelled or modified, and the uplink signal may be transmitted before or after the symbol in which the lower priority communication is scheduled. For example, the uplink signal may include UCI or a MAC-CE, among other examples. Furthermore, in cases where the lower priority is modified (for example, the wireless node 830 performs both the uplink communication and the downlink communication but modified one or more communication parameters for the lower priority communication), the uplink signal may indicate the one or more communication parameters that were modified for the lower priority communication (for example, a reduced transmit power or a change to a transmit beam or a receive beam, among other examples).

FIG. 9 is a flowchart illustrating an example process 900 performed, for example, by a wireless node in accordance with various aspects of the present disclosure. The example process 900 is an example where a wireless node (for example, wireless node 820) performs operations relating to a slot format configuration to support full-duplex operation.

As shown in FIG. 9, in some aspects, process 900 may include receiving, from a control node, information identifying a slot configuration pattern for a wireless communication link between the wireless node and another wireless node, wherein the information identifying the slot configuration pattern indicates one or more symbols configured to support full-duplex communication (block 910). For example, the wireless node may receive (for example, using antenna 234, DEMOD 232, MIMO detector 236, receive processor 238, controller/processor 240, antenna 252, DEMOD 254, MIMO detector 256, receive processor 258, or controller/processor 280), from a control node, information identifying a slot configuration pattern for a wireless communication link between the wireless node and another wireless node, as described above. In some aspects, the information identifying the slot configuration pattern indicates one or more symbols configured to support full-duplex communication.

As further shown in FIG. 9, in some aspects, process 900 may include communicating with the other wireless node in the one or more symbols configured to support full-duplex communication in accordance with the slot configuration pattern (block 920). For example, the wireless node may communicate (for example, using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, or MOD 254) with the other wireless node in the one or more symbols configured to support full-duplex communication in accordance with the slot configuration pattern, as described above.

Process 900 may include additional aspects, such as any single aspect or any combination of aspects described below or in connection with one or more other processes described elsewhere herein.

In a first additional aspect, receiving the information identifying the slot configuration pattern includes receiving information explicitly indicating the one or more symbols configured to support full-duplex communication in RRC signaling common to a cell associated with the control node, RRC signaling dedicated to the wireless node, or a slot format indicator carried in downlink control information.

In a second additional aspect, alone or in combination with the first aspect, the information identifying the slot configuration pattern implicitly indicates the one or more symbols configured to support full-duplex communication based at least in part on the received information relabeling a downlink symbol as an uplink symbol or a flexible symbol.

In a third additional aspect, alone or in combination with one or more of the first and second aspects, the one or more symbols configured to support full-duplex communication are implicitly indicated based at least in part on the received information relabeling an uplink symbol as a downlink symbol or a flexible symbol.

In a fourth additional aspect, alone or in combination with one or more of the first through third aspects, communicating with the other wireless node in the one or more symbols configured to support full-duplex communication includes simultaneously transmitting to the other wireless node and receiving from the other wireless node in the one or more symbols configured to support full-duplex communication.

In a fifth additional aspect, alone or in combination with one or more of the first through fourth aspects, communicating with the other wireless node in the one or more symbols configured to support full-duplex communication includes prioritizing an uplink communication or a downlink communication based at least in part on a simultaneous transmit and receive capability failing to satisfy a condition in the one or more symbols configured to support full-duplex communication.

In a sixth additional aspect, alone or in combination with one or more of the first through fifth aspects, prioritizing the uplink communication or the downlink communication includes prioritizing one of the uplink communication or the downlink communication that matches an original symbol type associated with the one or more symbols in which the simultaneous transmit and receive capability fails to satisfy the condition, prioritizing one of the uplink communication or the downlink communication that is dynamically scheduled, prioritizing one of the uplink communication or the downlink communication that was scheduled earlier or scheduled later.

In a seventh additional aspect, alone or in combination with one or more of the first through sixth aspects, communicating with the other wireless node in the one or more symbols configured to support full-duplex communication further includes cancelling or modifying one of the uplink communication or the downlink communication determined to be a lower priority communication.

In an eighth additional aspect, alone or in combination with one or more of the first through seventh aspects, the lower priority communication is cancelled or modified based at least in part on an uplink signal received from the other wireless node.

In a ninth additional aspect, alone or in combination with one or more of the first through eighth aspects, communicating with the other wireless node in accordance with the slot configuration pattern includes determining that a scheduled communication in a symbol is scheduled in a direction that conflicts with a symbol type, where the scheduled communication includes an uplink communication scheduled in a symbol having a downlink symbol type or a downlink communication scheduled in a symbol having an uplink symbol type, determining whether the scheduled communication satisfies a condition, and selectively performing a half-duplex operation for the scheduled communication in the direction that conflicts with the symbol type based at least in part on the scheduled communication satisfying the condition.

In a tenth additional aspect, alone or in combination with one or more of the first through ninth aspects, communicating with the other wireless node in accordance with the slot configuration pattern further includes receiving, from the other wireless node, an uplink signal to indicate whether the half-duplex operation is performed for the scheduled communication.

In an eleventh additional aspect, alone or in combination with one or more of the first through tenth aspects, the information identifying the slot configuration pattern includes a slot format indicator that changes a label for the symbol from a flexible symbol type to the downlink symbol type or the uplink symbol type.

In a twelfth additional aspect, alone or in combination with one or more of the first through eleventh aspects, communicating with the other wireless node in accordance with the slot configuration pattern includes determining that an uplink communication and a downlink communication are scheduled in a symbol having an uplink-only or a downlink-only symbol type, determining whether the uplink communication and the downlink communication satisfy a condition, and selectively performing a full-duplex operation in the symbol having the uplink-only or the downlink-only symbol type based at least in part on the uplink communication and the downlink communication satisfying the condition.

In a thirteenth additional aspect, alone or in combination with one or more of the first through twelfth aspects, selectively performing the full-duplex operation includes prioritizing one of the uplink communication or the downlink communication that matches the symbol type.

In a fourteenth additional aspect, alone or in combination with one or more of the first through thirteenth aspects, selectively performing the full-duplex operation includes prioritizing one of the uplink communication or the downlink communication that is dynamically scheduled.

In a fifteenth additional aspect, alone or in combination with one or more of the first through fourteenth aspects, the information identifying the slot configuration pattern includes a slot format indicator that changes a label for the symbol from a flexible symbol type to the downlink symbol type or the uplink symbol type.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

FIG. 10 is a flowchart illustrating an example process 1000 performed, for example, by a control node in accordance with various aspects of the present disclosure. The example process 1000 is an example where a control node (for example, control node 810) performs operations relating to a slot format configuration to support full-duplex operation.

As shown in FIG. 10, in some aspects, process 1000 may include determining a slot configuration pattern for a wireless communication link between a wireless node and another wireless node (block 1010). For example, the control node may determine (for example, using controller/processor 240, or memory 242) a slot configuration pattern for a wireless communication link between a wireless node and another wireless node, as described above.

As further shown in FIG. 10, in some aspects, process 1000 may include transmitting, to the wireless node, information identifying the slot configuration pattern for the wireless communication link, wherein the information identifying the slot configuration pattern indicates one or more symbols configured to support full-duplex communication (block 920). For example, the control node may transmit (for example, using controller/processor 240, transmit processor 220, TX MIMO processor 230, MOD 232, antenna 234, or memory 242), to the wireless node, information identifying the slot configuration pattern for the wireless communication link, as described above. In some aspects, the information identifying the slot configuration pattern indicates one or more symbols configured to support full-duplex communication.

Process 1000 may include additional aspects, such as any single aspect or any combination of aspects described in connection with one or more other processes described elsewhere herein.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
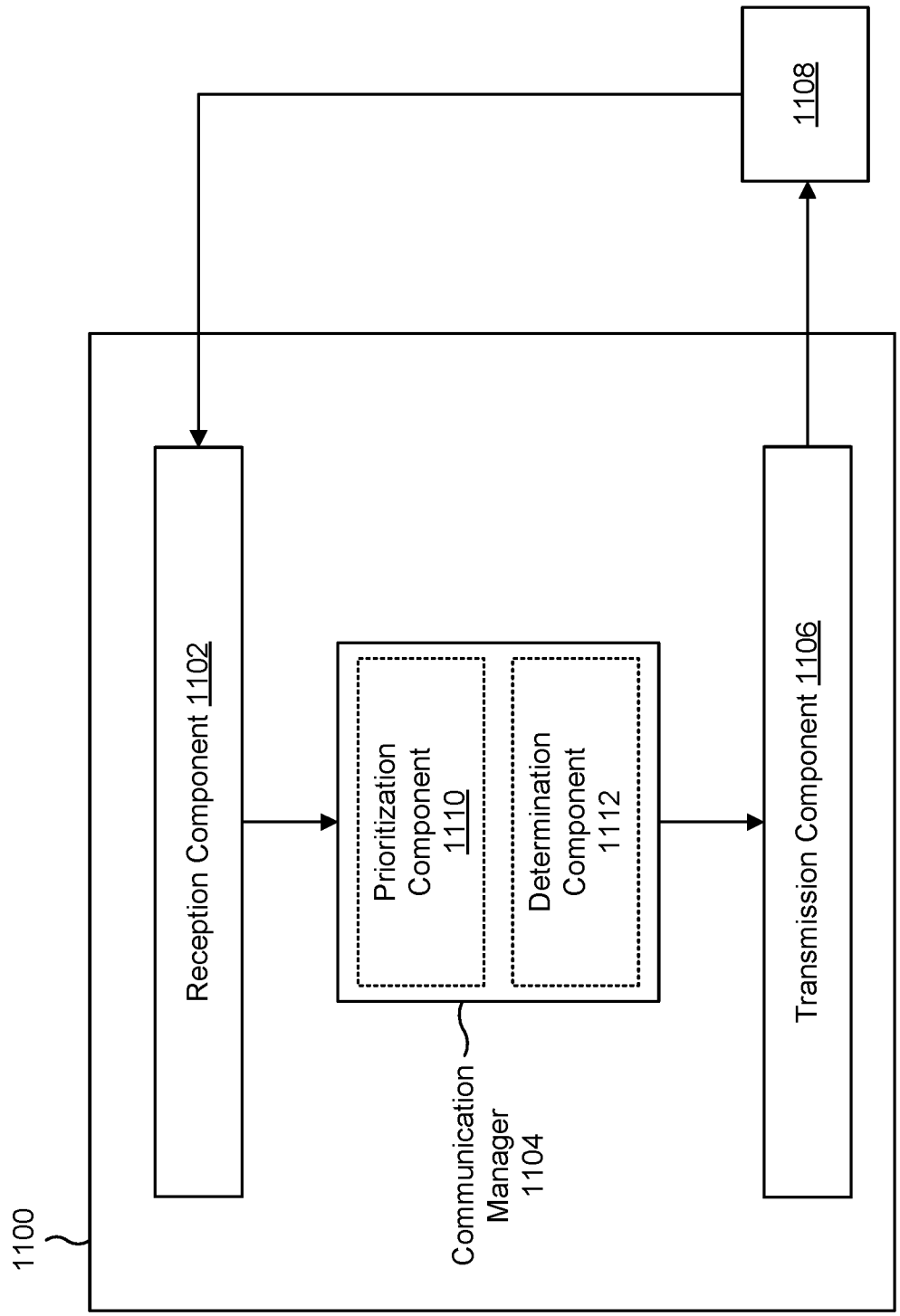
FIGS. 11-12 are diagrams of example apparatuses for wireless communication in accordance with various aspects of the present disclosure.

FIG. 11 is a block diagram of an example apparatus 1100 for wireless communication in accordance with various aspects of the present disclosure. The apparatus 1100 may be a wireless node, or a wireless node may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, a control node, or another wireless communication device) using the reception component 1102 and the transmission component 1106.

In some aspects, the apparatus 1100 may be configured to perform one or more operations described herein in connection with FIG. 8. Additionally or alternatively, the apparatus 1100 may be configured to perform one or more processes described herein, such as process 900 of FIG. 9. In some aspects, the apparatus 1100 may include one or more components of the UE or the base station described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE or the base station described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the UE or the base station described above in connection with FIG. 2. In some aspects, the transmission component 1106 may be co-located with the reception component 1102 in a transceiver.

The communication manager 1104 may receive or may cause the reception component 1102 to receive, from a control node, information identifying a slot configuration pattern for a wireless communication link between the wireless node and another wireless node, wherein the information identifying the slot configuration pattern indicates one or more symbols configured to support full-duplex communication. The communication manager 1104 may communicate with the other wireless node in the one or more symbols configured to support full-duplex communication in accordance with the slot configuration pattern. In some aspects, the communication manager 1104 may perform one or more operations described elsewhere herein as being performed by one or more components of the communication manager 1104.

The communication manager 1104 may include a controller/processor, a memory, a scheduler, a communication unit, or a combination thereof, of the wireless node described above in connection with FIG. 2. In some aspects, the communication manager 1104 includes a set of components, such as a prioritization component 1110, a determination component 1112, or a combination thereof. Alternatively, the set of components may be separate and distinct from the communication manager 1104. In some aspects, one or more components of the set of components may include or may be implemented within a controller/processor, a memory, a scheduler, a communication unit, or a combination thereof, of the UE or the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive, from a control node, information identifying a slot configuration pattern for a wireless communication link between the wireless node and another wireless node, wherein the information identifying the slot configuration pattern indicates one or more symbols configured to support full-duplex communication. The reception component 1102 or the transmission component 1106 may communicate with the other wireless node in the one or more symbols configured to support full-duplex communication in accordance with the slot configuration pattern.

The reception component 1102 may receive information explicitly indicating the one or more symbols configured to support full-duplex communication in one or more of RRC signaling common to a cell associated with the control node, RRC signaling dedicated to the wireless node, or a slot format indicator carried in DCI.

The prioritization component 1110 may prioritize an uplink communication or a downlink communication based at least in part on a simultaneous transmit and receive capability failing to satisfy a condition in the one or more symbols configured to support full-duplex communication.

The prioritization component 1110 may prioritize one of the uplink communication or the downlink communication that matches an original symbol type associated with the one or more symbols in which the simultaneous transmit and receive capability fails to satisfy the condition, one of the uplink communication or the downlink communication that is dynamically scheduled, one of the uplink communication or the downlink communication that was scheduled earlier or scheduled later, or one of the uplink communication or the downlink communication based at least in part on respective signal types associated with the uplink communication and the downlink communication.

The prioritization component 1110 may cancel or modify one of the uplink communication or the downlink communication determined to be a lower priority communication.

The determination component 1112 may determine that a scheduled communication in a symbol is scheduled in a direction that conflicts with a symbol type, where the scheduled communication includes an uplink communication scheduled in a symbol having a downlink symbol type or a downlink communication scheduled in a symbol having an uplink symbol type. The determination component 1112 may determine whether the scheduled communication satisfies a condition. The communication manager 1104 may selectively perform, or may cause the reception component 1102 or the transmission component 1106 to selectively perform, a half-duplex operation for the scheduled communication in the direction that conflicts with the symbol type based at least in part on the scheduled communication satisfying the condition.

The reception component 1102 may receive, from the other wireless node, an uplink signal to indicate whether the half-duplex operation is performed for the scheduled communication.

The determination component 1112 may determine that an uplink communication and a downlink communication are scheduled in a symbol having an uplink-only or a downlink-only symbol type. The determination component 1112 may determine whether the uplink communication and the downlink communication satisfy a condition. The communication manager 1104 may selectively perform, or may cause the reception component 1102 or the transmission component 1106 to selectively perform, a full-duplex operation in the symbol having the uplink-only or the downlink-only symbol type based at least in part on the uplink communication and the downlink communication satisfying the condition.

The prioritization component 1110 may prioritize one of the uplink communication or the downlink communication that matches the symbol type.

The prioritization component 1110 may prioritize one of the uplink communication or the downlink communication that is dynamically scheduled.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
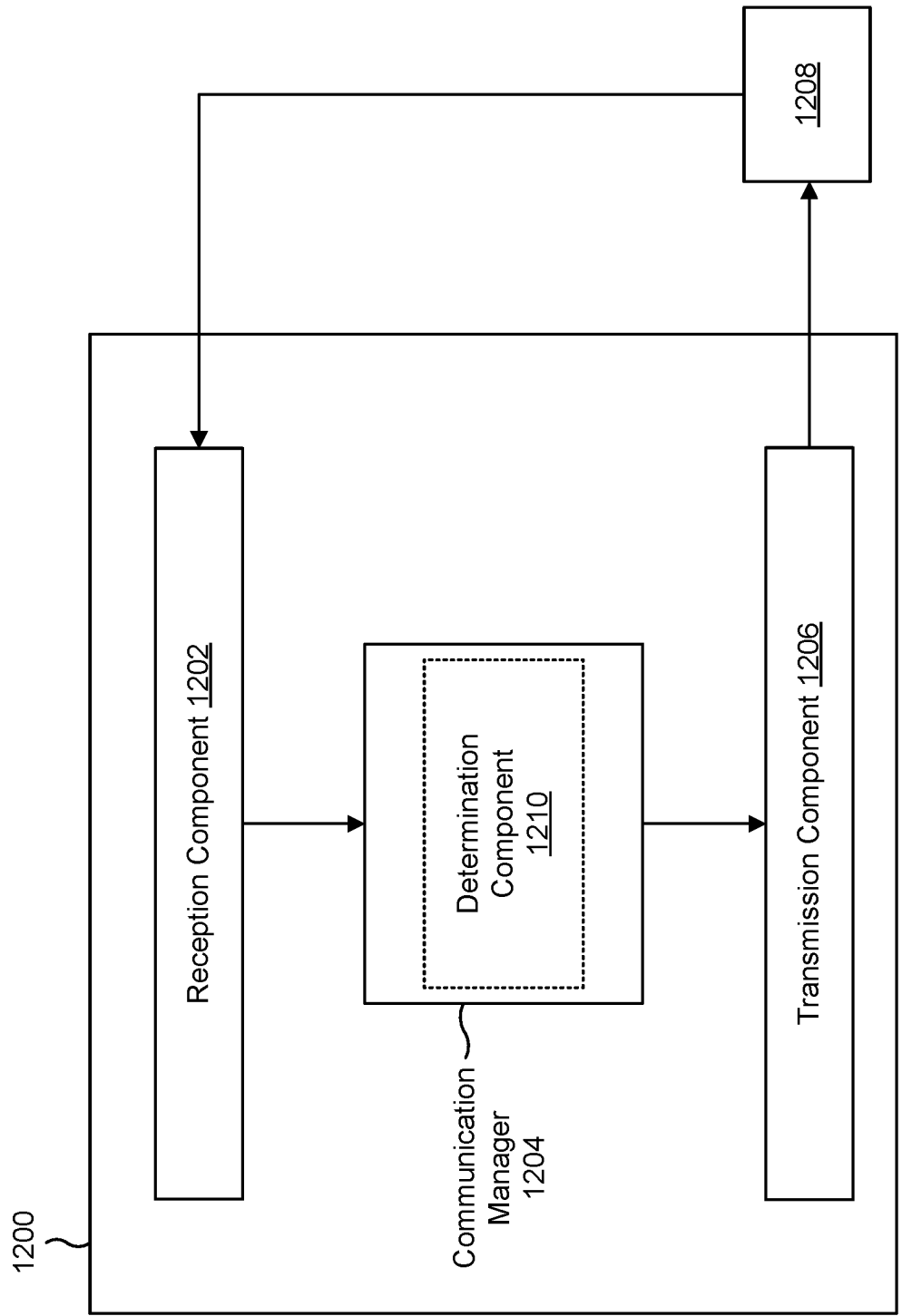

FIG. 12 is a block diagram of an example apparatus 1200 for wireless communication in accordance with various aspects of the present disclosure. The apparatus 1200 may be a control node, or a control node may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, an IAB node, or another wireless communication device) using the reception component 1202 and the transmission component 1206.

In some aspects, the apparatus 1200 may be configured to perform one or more operations described herein in connection with FIG. 8. Additionally or alternatively, the apparatus 1200 may be configured to perform one or more processes described herein, such as process 1000 of FIG. 10. In some aspects, the apparatus 1200 may include one or more components of the base station described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the base station described above in connection with FIG. 2. In some aspects, the transmission component 1206 may be co-located with the reception component 1202 in a transceiver.

The communication manager 1204 may determine a slot configuration pattern for a wireless communication link between a wireless node and another wireless node. The communication manager 1204 may transmit, or may cause the transmission component 1206 to transmit, to the wireless node, information identifying the slot configuration pattern for the wireless link, where the information identifying the slot configuration pattern indicates one or more symbols configured to support full-duplex communication. In some aspects, the communication manager 1204 may perform one or more operations described elsewhere herein as being performed by one or more components of the communication manager 1204.

The communication manager 1204 may include a controller/processor, a memory, a scheduler, a communication unit, or a combination thereof, of the base station described above in connection with FIG. 2. In some aspects, the communication manager 1204 includes a set of components, such as a determination component 1210. Alternatively, the set of components may be separate and distinct from the communication manager 1204. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 1210 may determine a slot configuration pattern for a wireless communication link between a wireless node and another wireless node. The transmission component 1206 may transmit, to the wireless node, information identifying the slot configuration pattern for the wireless link, where the information identifying the slot configuration pattern indicates one or more symbols configured to support full-duplex communication. In some aspects, the communication manager 1204 may perform one or more operations described elsewhere herein as being performed by one or more components of the communication manager 1204.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of aspects of the present disclosure:

Aspect 1: A method of wireless communication performed by a wireless node, comprising: receiving, from a control node, information identifying a slot configuration pattern for a wireless communication link between the wireless node and another wireless node, wherein the information identifying the slot configuration pattern indicates one or more symbols configured to support full-duplex communication; and communicating with the other wireless node in the one or more symbols configured to support full-duplex communication in accordance with the slot configuration pattern.

Aspect 2: The method of aspect 1, wherein receiving the information identifying the slot configuration pattern includes receiving information explicitly indicating the one or more symbols configured to support full-duplex communication in one or more of RRC signaling common to a cell associated with the control node, RRC signaling dedicated to the wireless node, or an SFI carried in DCI.

Aspect 3: The method of aspect 1, wherein the information identifying the slot configuration pattern implicitly indicates the one or more symbols configured to support full-duplex communication based at least in part on the received information relabeling a downlink symbol as an uplink symbol or a flexible symbol.

Aspect 4: The method of aspect 1, wherein the one or more symbols configured to support full-duplex communication are implicitly indicated based at least in part on the received information relabeling an uplink symbol as a downlink symbol or a flexible symbol.

Aspect 5: The method of any of aspects 1-4, wherein communicating with the other wireless node in the one or more symbols configured to support full-duplex communication comprises simultaneously transmitting to the other wireless node and receiving from the other wireless node in the one or more symbols configured to support full-duplex communication.

Aspect 6: The method of any of aspects 1-5, wherein communicating with the other wireless node in the one or more symbols configured to support full-duplex communication comprises prioritizing an uplink communication or a downlink communication based at least in part on a simultaneous transmit and receive capability failing to satisfy a condition in the one or more symbols configured to support full-duplex communication.

Aspect 7: The method of aspect 6, wherein prioritizing the uplink communication or the downlink communication comprises one or more of: prioritizing one of the uplink communication or the downlink communication that matches an original symbol type associated with the one or more symbols in which the simultaneous transmit and receive capability fails to satisfy the condition, prioritizing one of the uplink communication or the downlink communication that is dynamically scheduled, prioritizing one of the uplink communication or the downlink communication that was scheduled earlier or scheduled later, or prioritizing one of the uplink communication or the downlink communication based at least in part on respective signal types associated with the uplink communication and the downlink communication.

Aspect 8: The method of any of aspects 6-7, wherein communicating with the other wireless node in the one or more symbols configured to support full-duplex communication further comprises cancelling or modifying one of the uplink communication or the downlink communication determined to be a lower priority communication.

Aspect 9: The method of aspect 8, wherein the lower priority communication is cancelled or modified based at least in part on an uplink signal received from the other wireless node.

Aspect 10: The method of any of aspects 1-9, wherein communicating with the other wireless node in accordance with the slot configuration pattern comprises: determining that a scheduled communication in a symbol is scheduled in a direction that conflicts with a symbol type, wherein the scheduled communication includes an uplink communication scheduled in a symbol having a downlink symbol type or a downlink communication scheduled in a symbol having an uplink symbol type; determining whether the scheduled communication satisfies a condition; and selectively performing a half-duplex operation for the scheduled communication in the direction that conflicts with the symbol type based at least in part on the scheduled communication satisfying the condition.

Aspect 11: The method of aspect 10, wherein communicating with the other wireless node in accordance with the slot configuration pattern further comprises receiving, from the other wireless node, an uplink signal to indicate whether the half-duplex operation is performed for the scheduled communication.

Aspect 12: The method of any of aspects 10-11, wherein the information identifying the slot configuration pattern includes an SFI that changes a label for the symbol from a flexible symbol type to the downlink symbol type or the uplink symbol type.

Aspect 13: The method of any of aspects 1-12, wherein communicating with the other wireless node in accordance with the slot configuration pattern comprises: determining that an uplink communication and a downlink communication are scheduled in a symbol having an uplink-only or a downlink-only symbol type; and determining whether the uplink communication and the downlink communication satisfy a condition; and selectively performing a full-duplex operation in the symbol having the uplink-only or the downlink-only symbol type based at least in part on the uplink communication and the downlink communication satisfying the condition.

Aspect 14: The method of aspect 13, wherein selectively performing the full-duplex operation comprises prioritizing one of the uplink communication or the downlink communication that matches the symbol type.

Aspect 15: The method of any of aspects 13-14, wherein selectively performing the full-duplex operation comprises prioritizing one of the uplink communication or the downlink communication that is dynamically scheduled.

Aspect 16: The method of any of aspects 13-15, wherein the information identifying the slot configuration pattern includes an SFI that changes a label for the symbol from a flexible symbol type to the downlink symbol type or the uplink symbol type.

Aspect 17: An apparatus for wireless communication at a device, comprising a processor; memory coupled with the processor; and instructions stored in the memory and executable by the processor to cause the apparatus to perform the method of any of aspects 1-16.

Aspect 18: A device for wireless communication, comprising a memory and one or more processors coupled to the memory, the memory and the one or more processors configured to perform the method of any of aspects 1-16.

Aspect 19: An apparatus for wireless communication, comprising at least one means for performing the method of any of aspects 1-16.

Aspect 20: A non-transitory computer-readable medium storing code for wireless communication, the code comprising instructions executable by a processor to perform the method of any of aspects 1-16.

Aspect 21: A non-transitory computer-readable medium storing a set of instructions for wireless communication, the set of instructions comprising one or more instructions that, when executed by one or more processors of a device, cause the device to perform the method of any of aspects 1-16.

Aspect 22: A method of wireless communication performed by a control node, comprising: determining a slot configuration pattern for a wireless communication link between a wireless node and another wireless node; and transmitting, to the wireless node, information identifying the slot configuration pattern for the wireless link, wherein the information identifying the slot configuration pattern indicates one or more symbols configured to support full-duplex communication.

Aspect 23: An apparatus for wireless communication at a device, comprising a processor; memory coupled with the processor; and instructions stored in the memory and executable by the processor to cause the apparatus to perform the method of aspect 22.

Aspect 24: A device for wireless communication, comprising a memory and one or more processors coupled to the memory, the memory and the one or more processors configured to perform the method of aspect 22.

Aspect 25: An apparatus for wireless communication, comprising at least one means for performing the method of aspect 22.

Aspect 26: A non-transitory computer-readable medium storing code for wireless communication, the code comprising instructions executable by a processor to perform the method of aspect 22.

Aspect 27: A non-transitory computer-readable medium storing a set of instructions for wireless communication, the set of instructions comprising one or more instructions that, when executed by one or more processors of a device, cause the device to perform the method of aspect 22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A method of wireless communication performed by a wireless node, comprising:
   receiving, from a control node, information identifying a slot configuration pattern for a wireless communication link between the wireless node and another wireless node,
   the information identifying the slot configuration pattern indicating one or more symbols, of a slot, configured to support full-duplex communication, and
   the slot including the one or more symbols configured to support full-duplex communication and one or more uplink-only or downlink-only symbols; and
   communicating with the other wireless node in the one or more symbols configured to support full-duplex communication in accordance with the slot configuration pattern by prioritizing an uplink communication or a downlink communication in accordance with a simultaneous transmit and receive capability failing to satisfy a condition in the one or more symbols configured to support full-duplex communication.

2. The method of claim 1, wherein receiving the information identifying the slot configuration pattern includes receiving information explicitly indicating the one or more symbols configured to support full-duplex communication in one or more of radio resource control (RRC) signaling common to a cell associated with the control node, RRC signaling dedicated to the wireless node, or a slot format indicator carried in downlink control information.

3. The method of claim 1, wherein the information identifying the slot configuration pattern implicitly indicates the one or more symbols configured to support full-duplex communication in accordance with the received information relabeling a downlink symbol as an uplink symbol or a flexible symbol.

4. The method of claim 1, wherein the one or more symbols configured to support full-duplex communication are implicitly indicated in accordance with the received information relabeling an uplink symbol as a downlink symbol or a flexible symbol.

5. The method of claim 1, wherein prioritizing the uplink communication or the downlink communication comprises one or more of:
   prioritizing one of the uplink communication or the downlink communication that matches an original symbol type associated with the one or more symbols in which the simultaneous transmit and receive capability fails to satisfy the condition,

37 prioritizing one of the uplink communication or the downlink communication that is dynamically scheduled, prioritizing one of the uplink communication or the downlink communication that was scheduled earlier or scheduled later, or prioritizing one of the uplink communication or the downlink communication in accordance with respective signal types associated with the uplink communication and the downlink communication.

6. The method of claim 1, wherein communicating with the other wireless node in the one or more symbols configured to support full-duplex communication further comprises cancelling or modifying one of the uplink communication or the downlink communication determined to be a lower priority communication.

7. The method of claim 6, wherein the lower priority communication is cancelled or modified in accordance with an uplink signal received from the other wireless node.

8. The method of claim 1, wherein communicating with the other wireless node in accordance with the slot configuration pattern comprises:
selectively performing a half-duplex operation for a scheduled communication in a direction that conflicts with a symbol type.

9. The method of claim 8, wherein communicating with the other wireless node in accordance with the slot configuration pattern further comprises receiving, from the other wireless node, an uplink signal to indicate whether the half-duplex operation is performed for the scheduled communication.

10. The method of claim 1, wherein the information identifying the slot configuration pattern includes a slot format indicator that changes a label for a symbol from a flexible symbol type to a downlink symbol type or an uplink symbol type.

11. The method of claim 1, wherein communicating with the other wireless node in accordance with the slot configuration pattern comprises:
selectively performing a full-duplex operation in a symbol of the one or more uplink-only or downlink-only symbols.

12. The method of claim 11, wherein selectively performing the full-duplex operation comprises prioritizing a communication that is dynamically scheduled.

13. A wireless node for wireless communication, comprising:
a memory; and
one or more processors, coupled to the memory, configured to:
receive, from a control node, information identifying a slot configuration pattern for a wireless communication link between the wireless node and another wireless node,
the information identifying the slot configuration pattern indicating one or more symbols, of a slot, configured to support full-duplex communication, and
the slot including the one or more symbols configured to support full-duplex communication and one or more uplink-only or downlink-only symbols; and
communicate with the other wireless node in the one or more symbols configured to support full-duplex communication in accordance with the slot configuration pattern by prioritizing an uplink communication or a downlink communication in accordance

38 with a simultaneous transmit and receive capability failing to satisfy a condition in the one or more symbols configured to support full-duplex communication.

14. The wireless node of claim 13, wherein the one or more processors, when receiving the information identifying the slot configuration pattern, are configured to receive information explicitly indicating the one or more symbols configured to support full-duplex communication in one or more of radio resource control (RRC) signaling common to a cell associated with the control node, RRC signaling dedicated to the wireless node, or a slot format indicator carried in downlink control information.

15. The wireless node of claim 13, wherein the information identifying the slot configuration pattern implicitly indicates the one or more symbols configured to support full-duplex communication in accordance with the received information relabeling a downlink symbol as an uplink symbol or a flexible symbol.

16. The wireless node of claim 13, wherein the one or more symbols configured to support full-duplex communication are implicitly indicated in accordance with the received information relabeling an uplink symbol as a downlink symbol or a flexible symbol.

17. The wireless node of claim 13, wherein the one or more processors, when prioritizing the uplink communication or the downlink communication, are configured to:
prioritize one of the uplink communication or the downlink communication that matches an original symbol type associated with the one or more symbols in which the simultaneous transmit and receive capability fails to satisfy the condition,
prioritize one of the uplink communication or the downlink communication that is dynamically scheduled,
prioritize one of the uplink communication or the downlink communication that was scheduled earlier or scheduled later, or
prioritize one of the uplink communication or the downlink communication in accordance with respective signal types associated with the uplink communication and the downlink communication.

18. The wireless node of claim 13, wherein the one or more processors, when communicating with the other wireless node in the one or more symbols configured to support full-duplex communication, are configured to cancel or modifying one of the uplink communication or the downlink communication determined to be a lower priority communication.

19. The wireless node of claim 13, wherein the one or more processors, when communicating with the other wireless node in accordance with the slot configuration pattern, are configured to:
selectively perform a half-duplex operation for a scheduled communication in a direction that conflicts with a symbol type.

20. The wireless node of claim 13, wherein the information identifying the slot configuration pattern includes a slot format indicator that changes a label for a symbol from a flexible symbol type to a downlink symbol type or an uplink symbol type.

21. The wireless node of claim 13, wherein the one or more processors, when communicating with the other wireless node in accordance with the slot configuration pattern, are configured to:
selectively perform a full-duplex operation a symbol of the one or more uplink-only or downlink-only symbols.

22. The wireless node of claim 13, wherein the information identifying the slot configuration pattern includes a slot format indicator that changes a label for a symbol from a flexible symbol type to a downlink symbol type or an uplink symbol type.

23. The method of claim 1, wherein the full-duplex communication includes simultaneous uplink and downlink operations at a particular frequency.

24. The wireless node of claim 13, wherein the full-duplex communication includes simultaneous uplink and downlink operations at a particular frequency.

25. A non-transitory computer-readable medium storing a set of instructions for wireless communication, the set of instructions comprising:
one or more instructions that, when executed by one or more processors of a wireless node, cause the wireless node to:
receive, from a control node, information identifying a slot configuration pattern for a wireless communication link between the wireless node and another wireless node,
the information identifying the slot configuration pattern indicates one or more symbols, of a slot, configured to support full-duplex communication, and
the slot including the one or more symbols configured to support full-duplex communication and one or more uplink-only or downlink-only symbols; and
communicate with the other wireless node in the one or more symbols configured to support full-duplex communication in accordance with the slot configuration pattern by prioritizing an uplink communication or a downlink communication in accordance with a simultaneous transmit and receive capability failing to satisfy a condition in the one or more symbols configured to support full-duplex communication.

26. The non-transitory computer-readable medium of claim 25, wherein the information identifying the slot configuration pattern is explicitly indicated in one or more of radio resource control (RRC) signaling common to a cell associated with the control node, RRC signaling dedicated to the wireless node, or a slot format indicator carried in downlink control information.

27. The non-transitory computer-readable medium of claim 25, wherein the information identifying the slot configuration pattern implicitly indicates the one or more symbols configured to support full-duplex communication in accordance with the received information relabeling a downlink symbol as an uplink symbol or a flexible symbol.

28. The non-transitory computer-readable medium of claim 25, wherein the one or more symbols configured to support full-duplex communication are implicitly indicated in accordance with the received information relabeling an uplink symbol as a downlink symbol or a flexible symbol.

29. The non-transitory computer-readable medium of claim 25, wherein the information identifying the slot configuration pattern includes a slot format indicator that changes a label for a symbol from a flexible symbol type to a downlink symbol type or an uplink symbol type.

30. An apparatus, comprising:
means for receiving, from a control node, information identifying a slot configuration pattern for a wireless communication link between the apparatus and another apparatus,
the information identifying the slot configuration pattern indicating one or more symbols, of a slot, configured to support full-duplex communication, and
the slot including the one or more symbols configured to support full-duplex communication and one or more uplink-only or downlink-only symbols; and
means for communicating with the other wireless node in the one or more symbols configured to support full-duplex communication in accordance with the slot configuration pattern by prioritizing an uplink communication or a downlink communication in accordance with a simultaneous transmit and receive capability failing to satisfy a condition in the one or more symbols configured to support full-duplex communication.

* * * * *